(12) United States Patent
Jin et al.

(10) Patent No.: US 9,521,556 B2
(45) Date of Patent: Dec. 13, 2016

(54) COMMUNICATION METHOD USING DIRECT LINK IN WIRELESS NETWORK AND APPARATUS THEREFOR

(75) Inventors: Ho Jin, Yongin-si (KR); Kyung-ik Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1622 days.

(21) Appl. No.: 11/781,355

(22) Filed: Jul. 23, 2007

(65) Prior Publication Data

US 2008/0075038 A1    Mar. 27, 2008

(30) Foreign Application Priority Data

Sep. 26, 2006   (KR) .................. 10-2006-0093666

(51) Int. Cl.
| | |
|---|---|
| H04W 4/00 | (2009.01) |
| H04W 16/14 | (2009.01) |
| H04B 17/26 | (2015.01) |
| H04B 17/309 | (2015.01) |
| H04B 17/318 | (2015.01) |
| H04B 17/382 | (2015.01) |
| H04W 36/20 | (2009.01) |

(52) U.S. Cl.
CPC ............ *H04W 16/14* (2013.01); *H04B 17/26* (2015.01); *H04B 17/309* (2015.01); *H04B 17/318* (2015.01); *H04B 17/382* (2015.01); *H04W 36/20* (2013.01)

(58) Field of Classification Search
CPC ............................ H04W 72/121; H04W 84/18
USPC ........................................ 370/329, 343, 338
See application file for complete search history.

(56) References Cited

U.S. PATENT DOCUMENTS

| | | | |
|---|---|---|---|
| 6,697,013 B2 | 2/2004 | McFarland et al. | |
| 6,870,815 B2 | 3/2005 | McFarland et al. | |
| 6,937,582 B1* | 8/2005 | Kronestedt | 370/329 |
| 6,985,465 B2 | 1/2006 | Cervello et al. | |
| 7,129,884 B1* | 10/2006 | Tehrani et al. | 342/20 |
| 7,236,790 B2* | 6/2007 | Tsien et al. | 455/450 |
| 7,289,574 B2* | 10/2007 | Parolari | 375/295 |
| 7,606,193 B2* | 10/2009 | McFarland et al. | 370/329 |
| 2002/0095636 A1* | 7/2002 | Tatsumi et al. | 714/748 |
| 2003/0053437 A1* | 3/2003 | Bahl et al. | 370/345 |
| 2003/0107512 A1* | 6/2003 | McFarland et al. | 342/159 |
| 2004/0141472 A1* | 7/2004 | Haddad | 370/310 |
| 2004/0203403 A1* | 10/2004 | Cutcher et al. | 455/63.1 |
| 2004/0203820 A1* | 10/2004 | Billhartz | 455/452.1 |
| 2004/0264504 A1 | 12/2004 | Jin | |
| 2005/0036469 A1* | 2/2005 | Wentink | 370/338 |
| 2005/0053015 A1 | 3/2005 | Jin et al. | |

(Continued)

FOREIGN PATENT DOCUMENTS

| | | |
|---|---|---|
| KR | 10-2005-0000638 A | 1/2005 |
| KR | 10-2005-0017569 A | 2/2005 |
| KR | 10-2005-0068741 A | 7/2005 |

*Primary Examiner* — Kwasi Karikari
*Assistant Examiner* — Edward Zhang
(74) *Attorney, Agent, or Firm* — Sughrue Mion, PLLC

(57) ABSTRACT

A communication method using a direct link in a wireless network and an apparatus therefor are provided. Accordingly, it is determined whether the quality of a link channel is lower than a level during communication using the direct link or whether a signal which is received through the channel includes a radar signal, and the direct link channel is selectively changed to a new channel based on the determination result.

26 Claims, 19 Drawing Sheets

(56) References Cited

U.S. PATENT DOCUMENTS

| | | | |
|---|---|---|---|
| 2005/0261004 A1* | 11/2005 | Dietrich et al. | 455/456.2 |
| 2005/0265295 A1* | 12/2005 | Ishizuka | 370/336 |
| 2006/0034220 A1* | 2/2006 | Shinshou | 370/329 |
| 2006/0122476 A1* | 6/2006 | Van Slyke | 600/336 |
| 2006/0146869 A1* | 7/2006 | Zhang et al. | 370/465 |
| 2006/0209972 A1* | 9/2006 | Lemberger et al. | 375/260 |
| 2007/0008922 A1* | 1/2007 | Abhishek et al. | 370/329 |
| 2007/0038743 A1* | 2/2007 | Hellhake et al. | 709/224 |
| 2007/0097934 A1* | 5/2007 | Walker et al. | 370/338 |

* cited by examiner

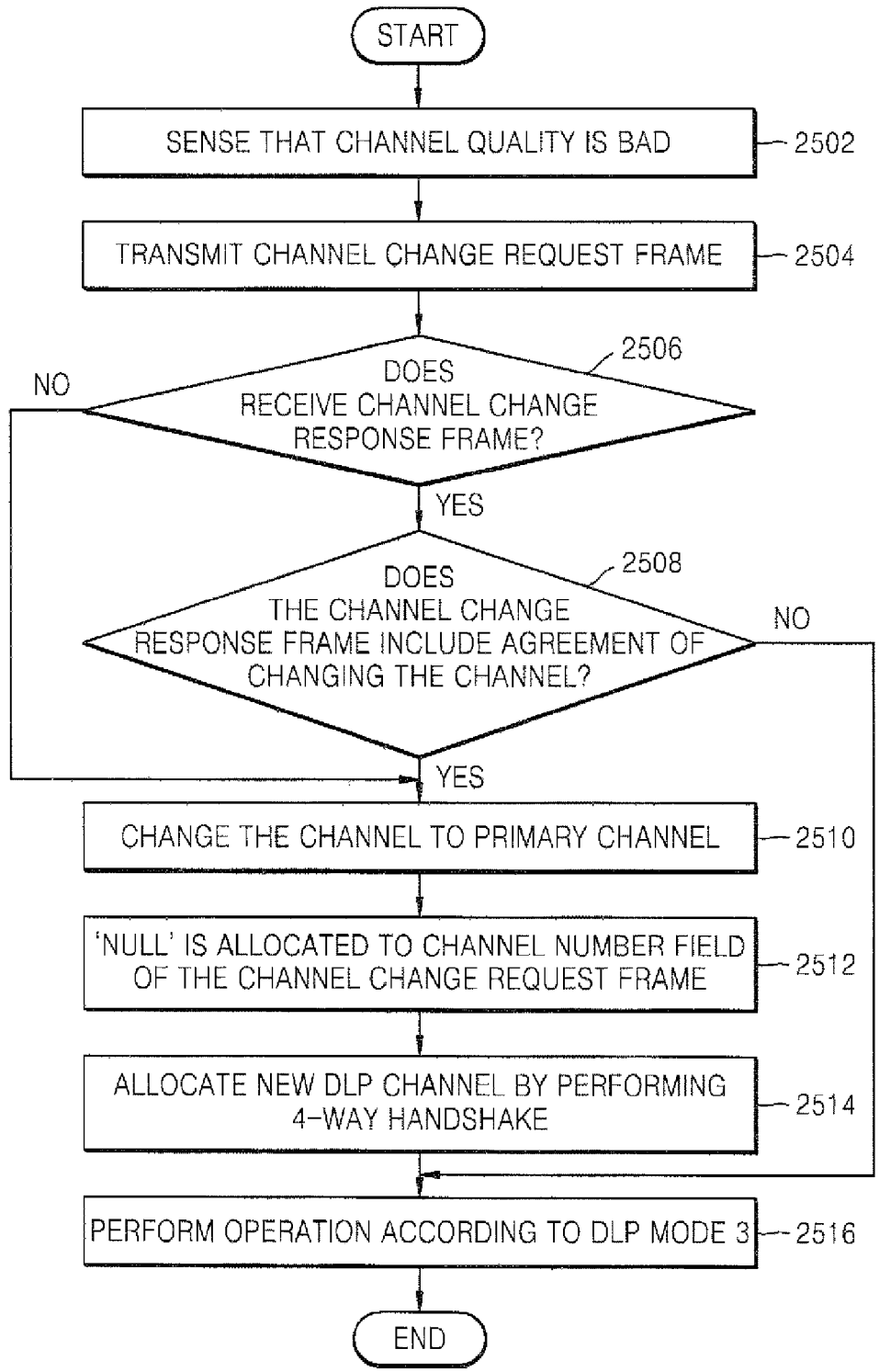

COMMUNICATION METHOD USING DIRECT LINK IN WIRELESS NETWORK AND APPARATUS THEREFOR

CROSS-REFERENCE TO RELATED PATENT APPLICATION

This application claims priority from Korean Patent Application No. 10-2006-0093666, filed on Sep. 26, 2006, in the Korean Intellectual Property Office, the disclosure of which is incorporated herein in its entirety by reference.

BACKGROUND OF THE INVENTION

Field of the Invention

Methods and apparatuses consistent with the present invention relate to communication in a wireless network, and more particularly, to communication using a direct link in a wireless network and an apparatus therefor.

Description of the Related Art

A method of using direct link protocol (DLP) and multi-channels in a basic service set (BSS) in order to maximize transmission efficiency in a wireless network has been suggested. Unlike a wired network, in the wireless network, communication may be interrupted by an external factor such as channel interference or noise. When a transmission interrupt occurs in a wireless communication system using a plurality of channels in the BSS, it is important to perform a fast handover to another available channel.

FIG. 1 illustrates an example of a roaming method performed by a station in a related art wireless communication environment.

FIG. 1 illustrates a procedure in which a mobile station 112 roams to a subnet Y 120 when the mobile station 112 in a subnet Z 130 is connected to another mobile station in a subnet X 110 through a quality of service (QoS) application. A related art operation performed in a media access control (MAC) layer when the mobile station 112 roams from the subnet X 110 to the subnet Y 120 in a wireless (local area network) LAN, will now be described. Here, it is assumed that a practical roaming operation is performed in an extended service set (ESS), and the subnet X 110 and the subnet Y 120 are included in the same ESS and overlap with each other.

When the roaming mobile station moves toward the subnet Y 120, and signal strength decreases, the roaming mobile station starts to search for a new channel for roaming. When searching for the channel in a passive mode, the roaming mobile station receives a beacon frame from the subnet Y 120. When searching for the channel in an active mode, the roaming station sends a probe request. The mobile station selects an access point (AP) that sends a stronger beacon frame or probe response than other APs.

In this example, the mobile station selects a new AP from an AP of the subnet Y 120 and sends a reassociation request to the new AP. The reassociation request includes information on the previous AP (the AP of the subnet X) and the mobile station itself. The previous AP does not recognize when the mobile station performs a handoff. The new AP informs the previous AP that the mobile station performs a handoff through an inter-access point protocol (IAPP). The mobile station joins a new channel through roaming by using the AP and starts sending and receiving data.

In the Institute of Electrical and Electronics Engineers (IEEE) 802.11 standards, communication methods that use an AP include a communication method using a distributed coordination function (DCF) and a communication method using a point coordination function (PCF) and the DCF.

FIG. 2 illustrates a procedure of transmitting data between stations according to a DCF rule. A transmitting station (STA1) 210 checks whether a receiving station (STA2) 220 in the same BSS receives data by sending an request to send (RTS) frame 212 before transmitting data.

The STA2 220 sends a clear to send (CTS) frame 222, which is a control frame indicating that the STA2 can receive the frame, and allows the STA1 to transmit data. Then, the STA1 transmits data. Network allocation vector (NAV) periods 232 and 234 can be set so that stations 230 other than the STA1 210 and STA2 220 in the same BSS know that the channel is busy and do not transmit data.

IEEE 802.11e has been introduced for complementing wireless LAN standards such as IEEE 802.11 in which QoS is weak. In IEEE 802.11e, in order to improve QoS, the AP manages channel duration and the transmission order of the nodes.

IEEE 802.11e supports multiple frame transmission; IEEE 802.11 only supports single frame transmission. Although network throughput is improved through multiple frame transmission, in an infrastructure mode, frame transmission has to be through the AP, and therefore, there is a problem in efficiency of performance of the network. In order to solve this problem, DLP is suggested so that the nodes directly communicate with each other without intervention of the AP, thereby improving the performance of the network. In DLP defined in the IEEE 802.11e, when the infrastructure mode is used in BSS, data can be communicated using an independent link between stations without intervention of the AP while communicating data. In addition, the DLP stably manages the channel using the AP and provides maximum throughput by direct communication between stations. Since the DLP data is not transmitted through the AP during data communication, the transmission efficiency is increased by reducing transmission time, propagation time, and AP MAC processing time.

In order to communicate data using the DLP, the DLP has to be firstly set up. Hereinafter, the DLP setup process will be described in detail.

FIG. 3 illustrates a DLP set up process according to an exemplary embodiment of the present invention.

First, QSTA1 310, which is a DLP request station (DLP requester), sends a DLP request frame to an AP 320 (1a).

The DLP request frame includes a transmission data rate and information on the capability of a station. Next, the AP simply retransmits the DLP request frame to a QSTA2 330, which is a receiving station (1b). The QSTA2 330 confirms the DLP request that is received from the AP 320 and sends to the AP 320 (2a) a DLP response frame including information on whether the QSTA2 330 will join a direct link 340. The DLP response frame includes a state code for giving a result on the DLP request, the transmission data rate, and information on the capability of a station. Finally, the AP 320 simply retransmits the DLP response frame to the QSTA1 310 (2b). The aforementioned four processes are referred to as a 4-way handshake process.

FIG. 4 illustrates a DLP MAC frame according to a related art technique.

Referring to FIG. 4, actions are specified in a frame control field of a DLP MAC frame 400. The frame control field is a sub-field. A frame body field is divided into a category 410, a DLP action code 420, and DLP action bodies 430, 440, and 450.

A code '2' which represents DLP is recorded in the category 410. Codes are specified in the DLP action code 420 according to types of the DLP MAC frame 400. The types of the DLP MAC frame 400 include a DLP request frame, a DLP response frame, and a DLP state frame.

The DLP action body 430 of the DLP request frame includes a destination MAC address field for recording a MAC address of a station that receives a frame, a source MAC address field for recording a MAC address of a station that transmits a frame, a capability field for recording functions which can be supported by the transmitting station, a transmission rate field for recording a transmission rate which is supported by the transmitting station, and an extended capability field.

The DLP action body 440 of the DLP response frame includes a state code field for recording whether a station accepts a DLP communication request, a MAC address field for a MAC address of the station that receives a current frame, a source address field for recording a MAC address of the station that transmits the current frame, a capability field for recording functions which can be supported by the transmitting station, a transmission rate field for recording a transmission rate which is supported by the transmitting station, and an extended capability field.

The DLP action body 450 of the DLP state frame includes a destination MAC address field, a source MAC address field, and a random data field.

In order to overcome a limit of transmission efficiency due to sharing a channel, the DLP has been suggested in 802.11e (QoS). When the DLP is used, data can be directly transmitted without passing through the AP, and therefore, a propagation delay and transmission times can be reduced. In addition, since a MAC processing time is not used in the AP, more data can be transmitted in a given time. However, since a limit of a current DCF in which one channel is shared is not overcome, as the number of stations increases, contention in a DCF segment increases, and therefore, the transmission efficiency decreases. In order to overcome the disadvantages due to sharing one channel, a method of using multiple channels using the DLP is suggested. However, in wireless communication, it is difficult to avoid channel interference and signal strength change due to the impact of the external environment on a physical layer.

When the multiple channels are employed by using the DLP and problems occur in an independent channel which the DLP stations use in the BSS due to internal or external factors, a method of changing the channel is needed. When the quality of the channel through which communication between DLP stations is performed deteriorates, it is necessary to maintain an effective and stable communication state by actively changing the channel.

In the communication using a wireless LAN, interference with radar signals may occur at 5 GHz. Accordingly, in European Telecommunications Standards Institute (ETSI) and Federal Communications Commission (FCC) in addition to International Telecommunications Union-Radiocommunications (ITU-R), a radar signal is detected, and communication is performed again through a new channel by avoiding a channel in which the radar signal is located. However, in the existing techniques, there is no method of avoiding a channel in which the radar signal is located.

SUMMARY OF THE INVENTION

The present invention provides a communication method using a direct link in a wireless network capable of minimizing data loss due to interference or decrease of signal strength through a method of actively changing a channel according to a DLP channel state and providing a stable and high transmission rate, and an apparatus therefor.

According to an aspect of the present invention, there is provided a communication method in a wireless network using a direct link, the method comprising: determining whether the quality of a direct link channel is lower than a predetermined level or whether a signal received through the direct link channel includes a radar signal, during communication using the direct link; and selectively changing the direct link channel to another channel based on the determination result.

In the above aspect of the present invention, the selectively changing the direct link channel to another channel may comprise: allowing a predetermined station to change a current channel with a primary channel and request the access point to allocate an available channel; and changing the direct link channel to a predetermined channel if the predetermined channel is allocated in response to the request for the available channel.

In addition, the predetermined level may represent whether cases where an averaged RSSI (Received Signal Strength Indication) is less than the predetermined threshold successively occur more frequently than a predetermined frequency.

In addition, whether the quality of the direct link channel is lower than the predetermined level may represent whether the number of successive retrials reaches a retry limit more than a predetermined number of times in the time it takes to transmit a predetermined number of frames.

In addition, the determining whether the received signal includes the radar signal may comprise: measuring whether RSSI exceeds a predetermined threshold; determining whether the received signal includes a signal that is estimated to be the radar signal if the RSSI exceeds the predetermined threshold from the detection result; and determining whether the signal that is estimated to be the radar signal is a radar signal if the received signal includes the signal that is estimated to be the radar signal.

In addition, the determining whether the received signal includes the signal that is estimated to be the radar signal may further comprise reducing the strength of the wireless LAN signal so that the strength difference is equal to or less than the predetermined strength difference threshold, if the received signal includes the wireless LAN signal, and the strength difference between the wireless LAN signal and the signal that is estimated to be the radar signal is equal to or greater than the strength difference predetermined threshold.

In addition, the determining whether the received signal includes the signal that is estimated to be the radar signal may comprise determining that the received signal includes the signal that is estimated to be the radar signal, if the wireless LAN packet is detected in the received signal, and a signal error caused by inaccurately receiving signal information occurs.

In addition, the determining whether the received signal includes the signal that is estimated to be the radar signal may comprise determining that the received signal includes the signal that is estimated to be the radar signal, if the wireless LAN packet is detected in the received signal, and the equalized signal to noise ratio sharply decreases.

In addition, the determining whether the received signal includes the signal that is estimated to be the radar signal may comprise determining that the received signal includes the signal that is estimated to be the radar signal, if the wireless LAN packet is detected in the received signal, and an FCS (frame check sequence) error caused by inaccurately receiving contents of data occurs.

In addition, the determining whether the received signal includes the signal that is estimated to be the radar signal may comprise: determining whether power decreases by detecting a pulse in the received signal if no wireless LAN packet is detected in the received signal; and determining that the received signal includes the signal that is estimated to be the radar signal based on whether the pulse is periodic and whether it is determined as a result of detection that the power decreases in the pulse.

In addition, the determining whether the received signal includes the signal that is estimated to be the radar signal may comprise: measuring a parameter of the received signal; storing the parameter; and determining whether the signal that is estimated to be the radar signal is the radar signal by analyzing the stored parameter.

In addition, the measuring the parameter and the storing the measured parameter may be repeatedly performed until the number of stored parameters exceeds a predetermined parameter number threshold.

In addition, the parameter may include at least one of a generation time of the signal, pulse width, and an interval between a current signal and a previous signal.

In addition, in the determining whether the signal that is estimated to be the radar signal, the signal that is estimated to be the radar signal may be determined as the radar signal if the period of the signal that is estimated to be the radar signal is similar to that of the radar signal.

According to another aspect of the present invention, there is provided a station in a wireless network using a direct link, the station comprising: a channel analyzer determining whether quality of a direct link channel is lower than a predetermined level or whether a signal received through a channel includes a radar signal, during communication using a direct link; a frame generator generating a predetermined frame used for selectively changing a direct link channel to another channel based on the determination result of the channel analyzer; and a frame transceiver transmitting the generated frame to the access point or another station and receives the generated frame from the access point or another station.

In the above aspect of the present invention, the channel analyzer may comprise: a channel state determiner determining whether the quality of the direct link channel is lower than the predetermined level during communication using the direct link; and a radar signal detector determining whether the signal received through the channel includes the radar signal.

In addition, the channel state determiner may determine that quality of the channel is bad if cases where an averaged RSSI is less than the predetermined threshold successively occur more frequently than a predetermined frequency.

In addition, the channel state determiner may determine that the quality of the channel is bad if the number of successive retrials reaches a retry limit more than a predetermined number of times in the time it takes to transmit a predetermined number of frames.

In addition, the radar signal detector may comprise: a signal strength measurer measuring whether the strength of the received signal exceeds a predetermined threshold; an estimated radar signal detector detecting whether the received signal includes the signal that is estimated to be the radar signal, if as a result of measuring signal strength it is determined that the strength of the received signal exceeds the predetermined threshold; and a radar signal determiner determining whether the signal that is estimated to be the radar signal is the radar signal, if the received signal includes the signal that is estimated to be the radar signal as a result of detection of the estimated radar signal detector.

In addition, the estimated radar signal detector may reduce the strength of the wireless LAN signal so that the strength difference is equal to or less than a predetermined strength difference threshold, if the received signal includes the wireless LAN signal, and the strength difference between the wireless LAN signal and the signal that is estimated to be the radar signal is equal to or greater than the predetermined strength difference threshold.

In addition, the estimated radar signal detector may determine that the received signal includes the signal that is estimated to be the radar signal if the wireless LAN packet is detected in the received signal, and a signal error caused by inaccurately receiving signal information occurs.

In addition, the estimated radar signal detector may determine that the received signal includes the signal that is estimated to be the radar signal if the wireless LAN packet is detected in the received signal, and the equalized signal to noise ratio sharply decreases.

In addition, the estimated radar signal detector may determine that the received signal includes the signal that is estimated to be the radar signal, if the wireless LAN packet is detected in the received signal, and an FCS (frame check sequence) error caused by inaccurately receiving contents of data occurs.

In addition, if no wireless LAN packet is detected in the received signal, the estimated radar signal detector may determine whether power decreases by detecting a pulse in the signal, and if it is determined as a result of detection that the power decreases in the pulse, the estimated radar signal detector may analyze whether the pulse is periodic and determine that the received signal includes the signal that is estimated to be the radar signal if the pulse is periodic.

In addition, the radar signal determiner may comprise: a parameter measurer measuring a parameter from the received signal, if the received signal includes the signal that is estimated to be the radar signal, as a result of detection of the estimated radar signal detector; a buffer storing the parameter measured by the parameter measurer; and a parameter analyzer determining whether the signal that is estimated to be the radar signal is the radar signal by analyzing the parameters stored in the buffer.

In addition, the parameter measurer may repeatedly measure the parameter until the number of the parameters stored in the buffer exceeds a predetermined parameter number threshold, and wherein the buffer repeatedly stores the parameter measured by the parameter measurer until the number of stored parameters exceeds the predetermined parameter number threshold.

In addition, the parameter may include at least one of a generation time of the signal, pulse width, and an interval between a current signal and a previous signal.

In addition, the parameter analyzer may determine that the signal that is estimated to be the radar signal is the radar signal, if the period of the signal that is estimated to be the radar signal is similar to that of the radar signal.

According to another aspect of the present invention, there is provided an access point in a wireless network using a direct link, the access point comprising: a channel manager periodically scanning the available channels for allocating channels, analyzing the scanned channels, and generating a list of the available channels; a channel number recorder recording the channel number in the channel list that is recorded in the channel change request frame, when receiving the channel change request frame from a predetermined station; and a frame transceiver retransmitting the channel change response frame, which is a response to the channel change request frame and the channel change request frame, to another station.

BRIEF DESCRIPTION OF THE DRAWINGS

The above and other features of the present invention will become more apparent by describing in detail exemplary embodiments thereof with reference to the attached drawings in which:

FIG. 25 is a flowchart illustrating the procedure of changing channels in the procedure of transmitting data in DLP mode 3 shown in FIG. 24.

DETAILED DESCRIPTION OF THE EXEMPLARY EMBODIMENTS OF THE INVENTION

Now, exemplary embodiments of the present invention will be described in detail with reference to the attached drawings.

Figure 1:
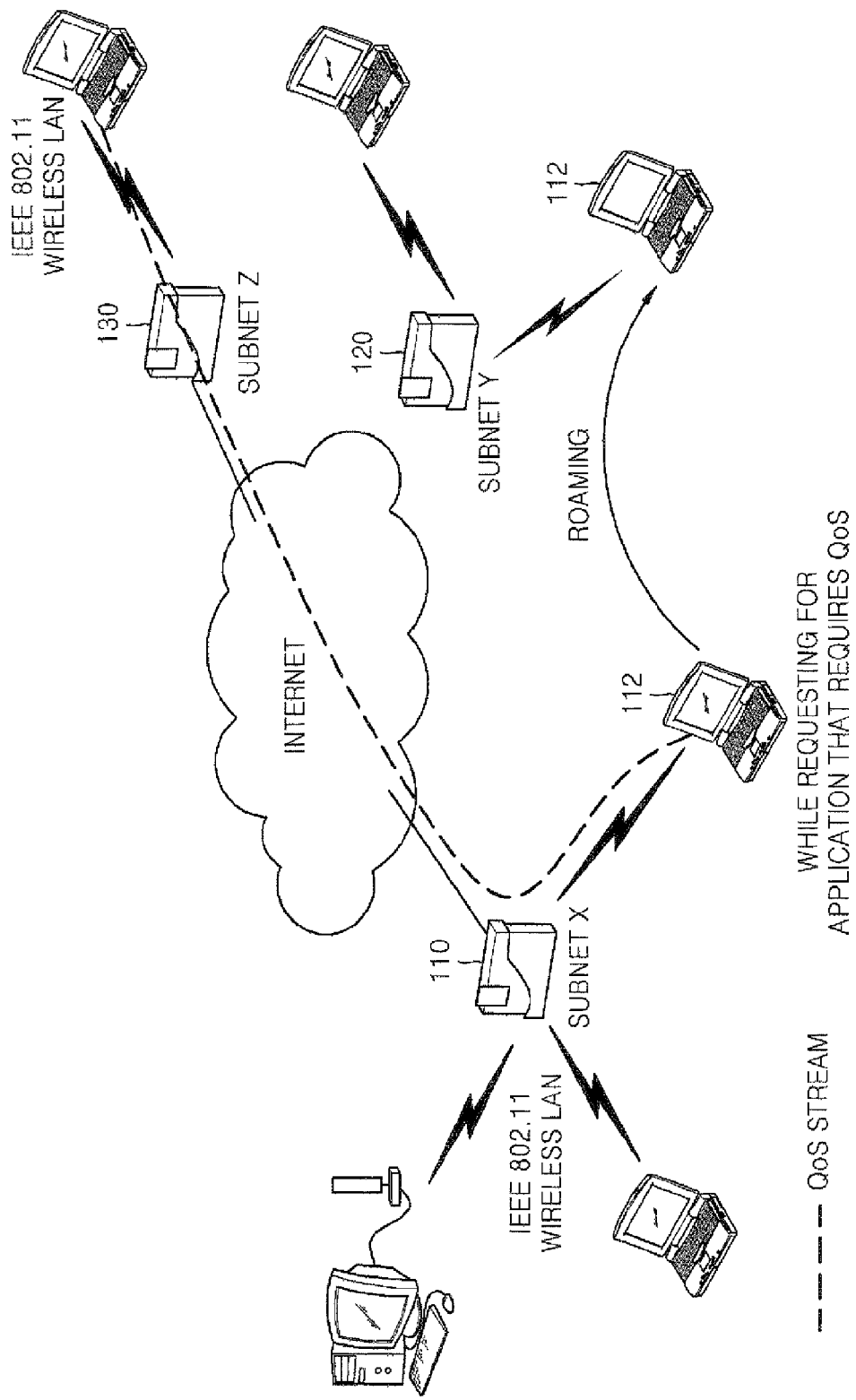
FIG. 1 illustrates an example of a roaming method performed by a station in related art wireless communication environments.
Figure 2:
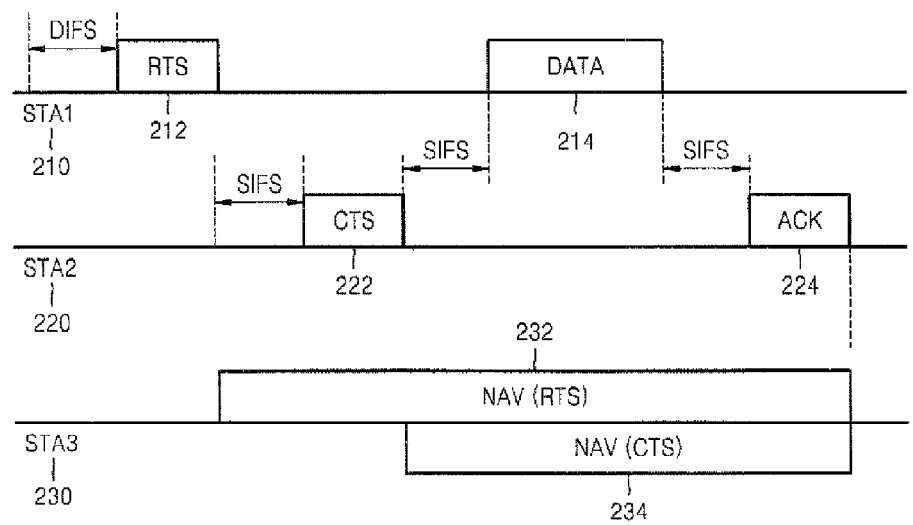
FIG. 2 illustrates a procedure of transmitting data between stations according to a DCF rule.
Figure 3:
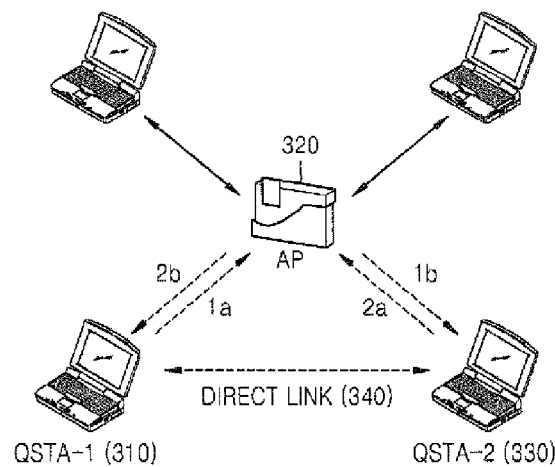
FIG. 3 illustrates a DLP set up procedure according to an exemplary embodiment of the present invention.
Figure 4:
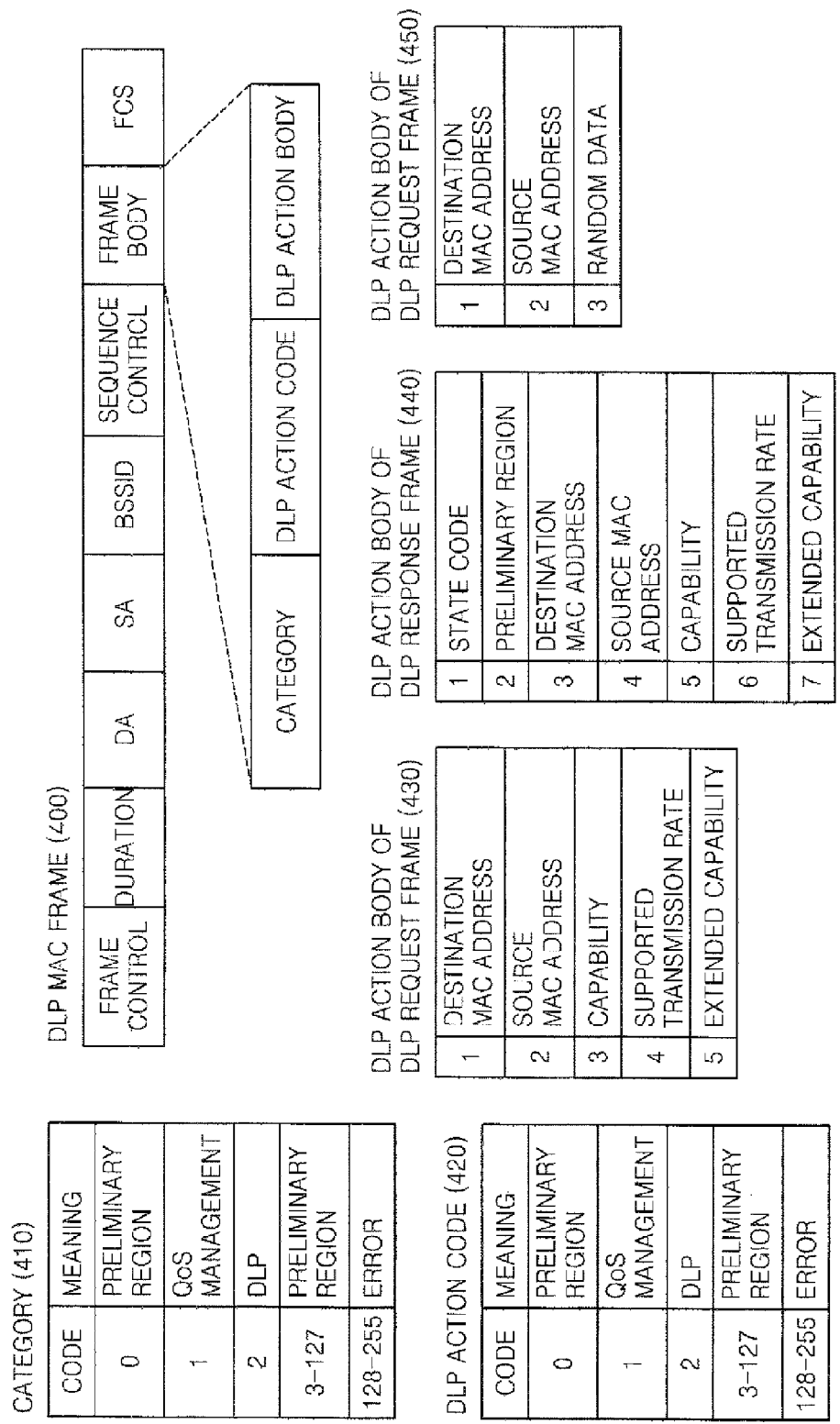
FIG. 4 illustrates a DLP MAC frame according to a related art technique.
Figure 5:
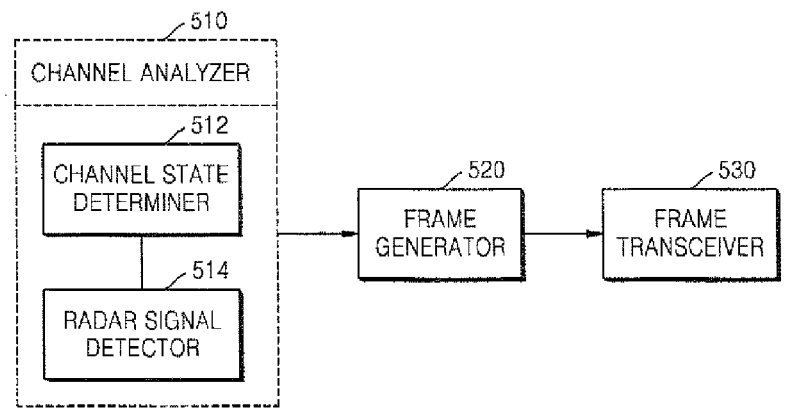
FIG. 5 illustrates a station in a wireless network using a direct link according to an exemplary embodiment of the present invention.

FIG. 5 illustrates a station in a wireless network using a direct link according to an exemplary embodiment of the present invention.

Referring to FIG. 5, the station in the wireless network using a direct link according to an exemplary embodiment of the present invention includes a channel analyzer 510, a frame generator 520, and a frame transceiver 530.

During communication using the direct link the channel analyzer 510 determines whether the quality of a direct link channel is lower than a predetermined level or whether a signal received through a channel includes a radar signal.

The channel analyzer 510 includes a channel state determiner 512 and a radar signal detector 514.

During communication using a direct link, the channel state determiner 512 determines whether the quality of the direct link channel is lower than the predetermined level.

Hereinafter, a method of determining whether the quality of the channel is lower than the predetermined level, that is to say, whether the channel state is bad or not, is described.

The levels for determining the channel state are determined by using dot11PeriodFactor, dot11AVGRSSI, dot11TotalRetryCount, and dot11TotalPoorMeasurement specified in a management information base (MIB) that is used for IEEE 802.11 wireless LAN standards.

A first method uses RSSI. An averaged RSSI of a predetermined number of frames specified in the dot11PeriodFactor is measured and compared with a totally averaged RSSI. When a case where the measured value is lower than the dot11AVGRSSI successively occurs more than dot11TotalPoorMeasurement times, the channel state is determined to be bad.

In a second method, the channel state is determined by measuring the frequency at which the number of retrials reaches a retry limit. For example, when dot11PeriodFactor is 100, and dot11TotalRetryCount is 5, the channel state is determined to be bad when the number of retrials reaches MaxRetryLimit more than 5 times for every 100 frames transmitted. A composite level may be set up in consideration of the two aforementioned levels.

However, a method of determining whether the channel state is bad or not is not limited to the aforementioned methods.

The radar signal detector 514 determines whether the signal received through the channel includes the radar signal.

Figure 6:
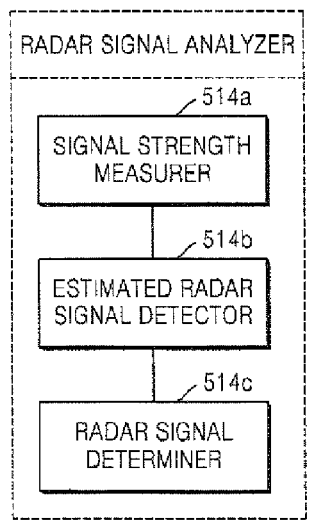
FIG. 6 illustrates a radar signal detector of a station according to an exemplary embodiment of the present invention.

FIG. 6 illustrates a radar signal detector of a station according to an exemplary embodiment of the present invention.

Referring to FIG. 6, the radar signal detector 514 includes a signal strength measurer 514a, an estimated radar signal detector 514b, and a radar signal determiner 514c.

The signal strength measurer 514a measures whether the strength of a received signal exceeds a predetermined threshold. More specifically, RSSI of the received signal is compared with an interference sensing level. It is determined whether the RSSI of the received signal is greater than the interference sensing level. The interference sensing level may be determined to be 62 dBm or −64 dBm according to European Telecommunication Standard Institute (ETSI) 301 893. However, the interference sensing level may be changed in another exemplary embodiment.

If as a result of measurement it is determined that the strength of the received signal exceeds the predetermined threshold, the estimated radar signal detector 514b detects whether the received signal includes a signal that is estimated to be the radar signal.

Hereinafter, the operation of the estimated radar signal detector 514b will be described in detail.

The estimated radar signal detector 514b determines whether a wireless LAN packet is detected in the received signal. Then, the estimated radar signal detector 514b determines that the received signal includes a signal that is estimated to be the radar signal when the wireless LAN packet is detected in the received signal, and a signal error caused by inaccurately receiving signal information or an FCS error caused by inaccurately receiving contents of data occurs, or the equalized signal to noise ratio sharply decreases.

In addition, when no wireless LAN packet is detected in the received signal, the estimated radar signal detector 514b determines whether power decreases by detecting a pulse in the signal. When it is determined as a result of detection that the power decreases in the pulse, it is analyzed whether the pulse is periodic. If the pulse is periodic, it is determined that the received signal includes a signal that is estimated to be the radar signal.

Hereinafter, referring to FIGS. 7 to 9, an operation of the estimated radar signal detector 514b will be described.

Figure 7:
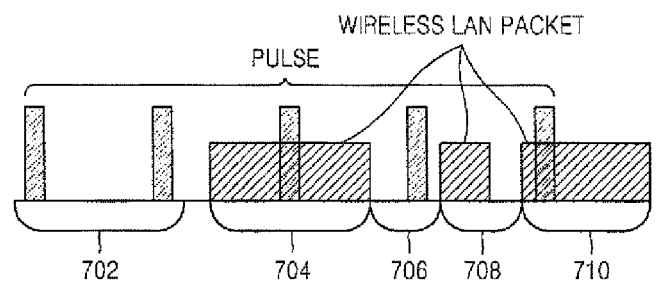
FIG. 7 illustrates a case where a wireless LAN packet is included in a signal received according to an exemplary embodiment of the present invention.

FIG. 7 illustrates a case where a wireless LAN packet is included in a signal received according to an exemplary embodiment of the present invention.

Referring to FIG. 7, no wireless LAN packet is detected in periods 702 and 706. The periods 702 and 706 include a period during which transmission is not performed and a period between wireless LAN packets. Since the pulse received in the periods 702 and 706, during which there is no wireless LAN packet, does not overlap a wireless LAN packet, the pulse can be detected. In this case, the pulse is not influenced by the wireless LAN signal. Accordingly, the RSSI of the pulse can be measured, the measured RSSI can be compared with the reference interference of the radar, and it is recognized whether the power decreases.

Wireless LAN packets are detected in periods 704, 708, and 710. When the pulse is received in the periods during which the wireless LAN packet is detected, the wireless LAN signal is not stably received due to the pulse. In this case, a signal error or an FCS error occurs depending on where the pulse is located in a data frame of the wireless LAN signal, and the equalized signal-to-noise ratio sharply decreases.

When the wireless LAN signal is not stably received, the estimated radar signal detector 514b determines that the received signal includes a signal that is estimated to be the radar signal.

Figure 8:
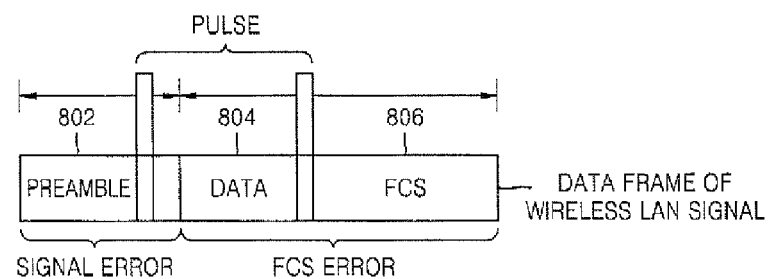
FIG. 8 illustrates a signal error and an FCS error.

FIG. 8 illustrates a signal error and an FCS error.

Referring to FIG. 8, a data frame of a wireless LAN signal includes a preamble field 802, a data field 804, and an FCS field 806. When the data frame of the wireless LAN signal overlaps the pulse, the wireless LAN signal is not stably received. This will be described below in detail.

When the pulse is received in the preamble field 802 of the wireless LAN signal, a signal error caused by inaccurate reception of the signal occurs. Alternatively, when the pulse is received in the data field 804 or the FCS field 806, an FCS error caused by inaccurately receiving the contents of the data occurs.

Figure 9:
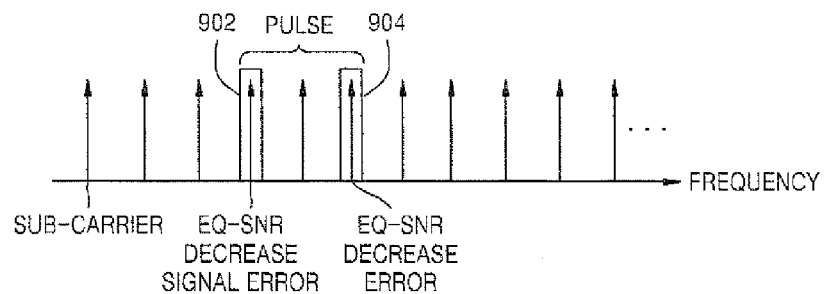
FIG. 9 illustrates a case where equalized signal to noise ratio sharply decreases.

FIG. 9 illustrates a case where equalized signal to noise ratio sharply decreases.

Referring to FIG. 9, the wireless LAN signal includes predetermined sub-carriers. Different sub-carriers are adjusted to be equalized. This represents equalized signal to noise ratio (EQ-SNR). When the received pulse overlaps sub-carriers 902 and 904 among the sub-carriers, the sub-carriers 902 and 904 have a greater portion of noise than the other sub-carriers. The EQ-SNR sharply decreases.

The signal error or FCS error also occurs depending on which period of the wireless data frame the pulse is received in, that is, the locations of the wireless data frame and the pulse. Referring to FIG. 8, the EQ-SNR sharply decreases, and the signal error 902 and the FCS error 904 occur at the same time.

As described above, when the EQ-SNR sharply decreases and the signal error 802 and the FCS error 804 occur, the estimated radar signal detector 514b determines that the received signal includes a signal that is estimated to be the radar signal.

Finally, when the received signal includes the wireless LAN signal, and the strength difference between the wireless LAN signal and the signal that is estimated to be the radar signal is equal to or greater than a predetermined threshold, the estimated radar signal detector 514 reduces the strength of the wireless LAN signal so that the strength difference is equal to or less than the predetermined threshold.

Figure 10:
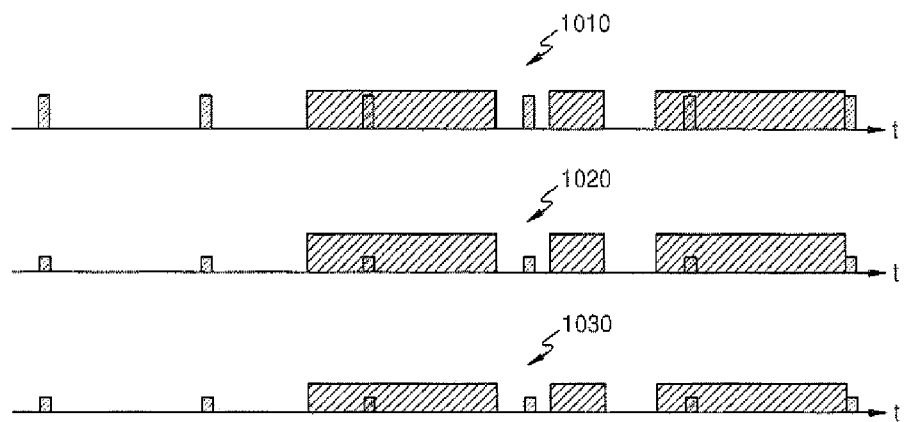
FIG. 10 illustrates a relation between strength of a wireless LAN signal and strength of a signal that is estimated to be a radar signal.

FIG. 10 illustrates a relation between strength of a wireless LAN signal and strength of a signal that is estimated to be a radar signal.

Referring to FIG. 10, in a case 1010, the strength of the wireless LAN signal is comparable to the strength of the signal that is estimated to be the radar signal. The estimated radar signal detector 514b can detect the signal that is estimated to be the radar signal using the aforementioned method.

However, in a case 1020, the strength of the signal that is estimated to be the radar signal is weak compared with that of the wireless LAN signal. Even when the wireless LAN signal practically includes the radar signal, the estimated radar signal detector 514b makes an error of determining that the wireless LAN signal does not include the signal that is estimated to be the radar signal.

Accordingly, the estimated radar signal detector 514b allows the signal that is estimated to be the radar signal to be detected by reducing the strength of the wireless LAN signal that is transmitted as in the case 1030.

As a result of detection of the estimated radar signal detector 514b, when the received signal includes the signal that is estimated to be the radar signal, the radar signal determiner 514c determines whether the signal that is estimated to be the radar signal is the radar signal.

Figure 11:
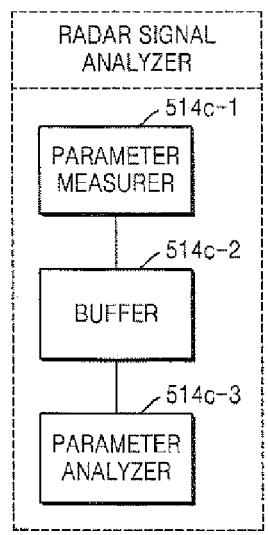
FIG. 11 illustrates a radar signal determiner of a station according to an exemplary embodiment of the present invention.

FIG. 11 illustrates a radar signal determiner of a station according to an exemplary embodiment of the present invention.

Referring to FIG. 11, the radar signal determiner 514c according to an exemplary embodiment of the present invention includes a parameter measurer 514c-1, a buffer 514c-2, and a parameter analyzer 514c-3.

As a result of detection of the estimated radar signal detector 514*b*, when the received signal includes the signal that is estimated to be the radar signal, the parameter measurer 514*c*-1 measures a parameter from the received signal.

The parameter may include a generation time of the signal, pulse width, and an interval between the current signal and the previous signal.

The buffer 514*c*-2 stores the parameter measured by the parameter measurer 514*c*-1.

The parameter analyzer 514*c*-3 determines whether the signal that is estimated to be the radar signal is the radar signal by analyzing the parameters stored in the buffer 514*c*-3.

Operations of measuring and storing the parameter may be repeatedly performed until the capacity of the buffer 514*c*-2 is full. Accordingly, sufficient samples for analyzing the parameters can be obtained. Specifically, when a predetermined number of parameters are not accumulated, signal features can not be analyzed. Therefore, enough parameter samples to analyze the signal feature are measured, stored, and then analyzed. The predetermined number or the capacity of the buffer may be different in other exemplary embodiments of the present invention.

Figure 12:
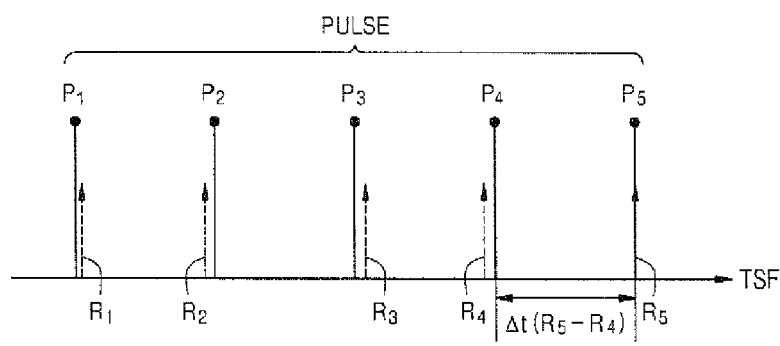
FIG. 12 illustrates an operation of a parameter analyzer of a station according to an exemplary embodiment of the present invention.

FIG. 12 illustrates an operation of a parameter analyzer of a station according to an exemplary embodiment of the present invention.

In FIG. 12, it is assumed that the received signals include five pulses $P_1$, $P_2$, $P_3$, $P_4$, and $P_5$. The reference signals are determined by Equation 1. Specifically, when an interval between two neighboring reference signals among reference signals $R_1$, $R_2$, $R_3$, $R_4$, and $R_5$ is $\Delta t$ $(R_n - R_{n-1})$, the reference signals are determined so that the difference between two neighboring intervals $\Delta_2 t_n = \Delta t(R_{n-1} - R_{n-2}) - \Delta t(R_n - R_{n-1})$ may approach 0.

$$\Delta_2 t_n = \Delta t(R_{n-1} - R_{n-2}) - \Delta t(R_n - R_{n-1})$$

$$\Delta_2 t_n = \Delta_2 t_{n-2} \ldots = \Delta_2 t_1 \approx 0 \qquad \text{[Equation 1]}$$

When the differences between locations of the aforementioned reference signals $P_1$, $P_2$, $P_3$, $P_4$, and $P_5$ and locations of real pluses $R_1$, $R_2$, $R_3$, $R_4$, and $R_5$ are lower than a predetermined threshold, the signal is periodic. The predetermined threshold is so small that the period of the signal that is estimated to be the radar signal is similar to that of the real radar signal.

When the period of the signal that is estimated to be the radar signal is similar to that of the radar signal, the parameter analyzer 514*c*-3 determines that the signal that is estimated to be the radar signal is the radar signal.

Figure 13:
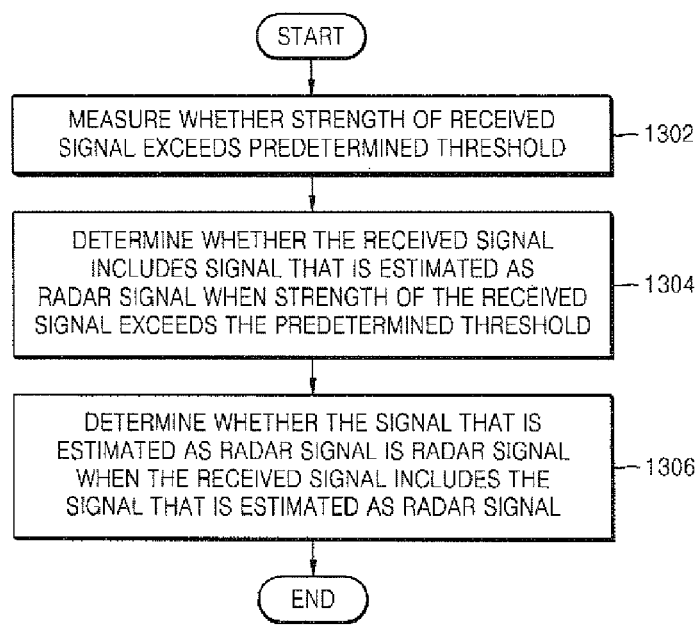
FIG. 13 is a flowchart illustrating an operation of a radar signal detector of a station according to an exemplary embodiment of the present invention.

FIG. 13 is a flowchart illustrating an operation of a radar signal detector of a station according to an exemplary embodiment of the present invention.

In operation 1302, it is measured whether strength of a received signal exceeds a predetermined threshold.

As described above, in the present invention, it is determined whether RSSI is greater than −62 dBm or −64 dBm, which is an interference sensing level. However, as described above, the interference sensing level is not limited to −62 dBm or −64 dBm.

In operation 1304, if as a result of measurement it is determined that the strength of the received signal exceeds the predetermined threshold, it is determined whether the received signal includes the signal that is estimated to be the radar signal.

As described above, the estimated radar signal detector 514*b* determines whether the received signal includes the signal that is estimated to be the radar signal. An operation of the estimated radar signal detector will be described in detail with reference to FIGS. 14 and 15.

In operation 1306, as a result of detection, when the received signal includes the signal that is estimated to be the radar signal, it is determined whether the signal that is estimated to be the radar signal is the radar signal.

As described above, it is determined whether the signal that is estimated to be the radar signal is the radar signal, by analyzing the parameter of the received signal in the radar signal determiner 514*c*.

Figure 14:
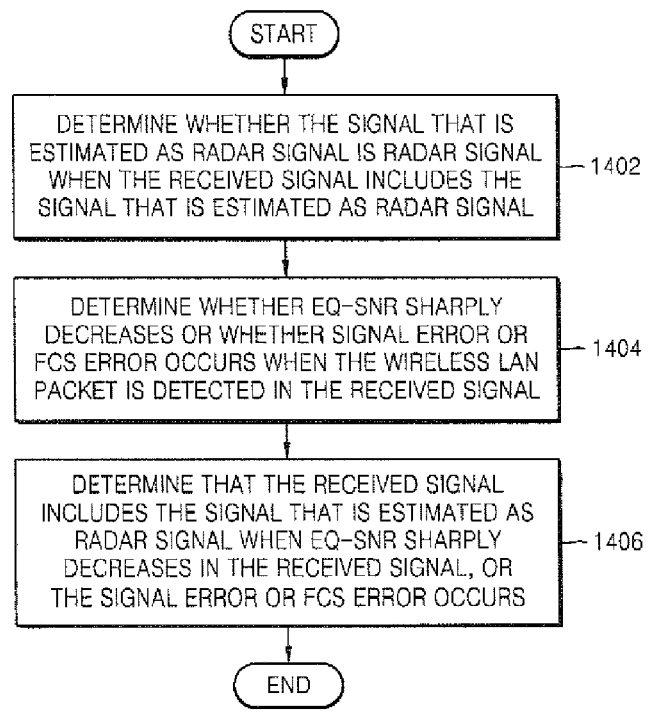
FIG. 14 is a flowchart illustrating an operation of an estimated radar signal detector of a station according to an exemplary embodiment of the present invention.

FIG. 14 is a flowchart illustrating an operation of an estimated radar signal detector of a station according to an exemplary embodiment of the present invention.

In operation 1402, it is determined whether a wireless LAN packet is detected in the received signal.

In operation 1404, when the wireless LAN packet is detected in the received signal, it is determined whether EQ-SNR sharply decreases or whether a signal error or FCS error occurs.

In operation 1406, as a result of the determination in operation 1404, when the EQ-SNR sharply decreases in the received signal, or the signal error or FCS error occurs, it is determined that the received signal includes the signal that is estimated to be the radar signal.

Figure 15:
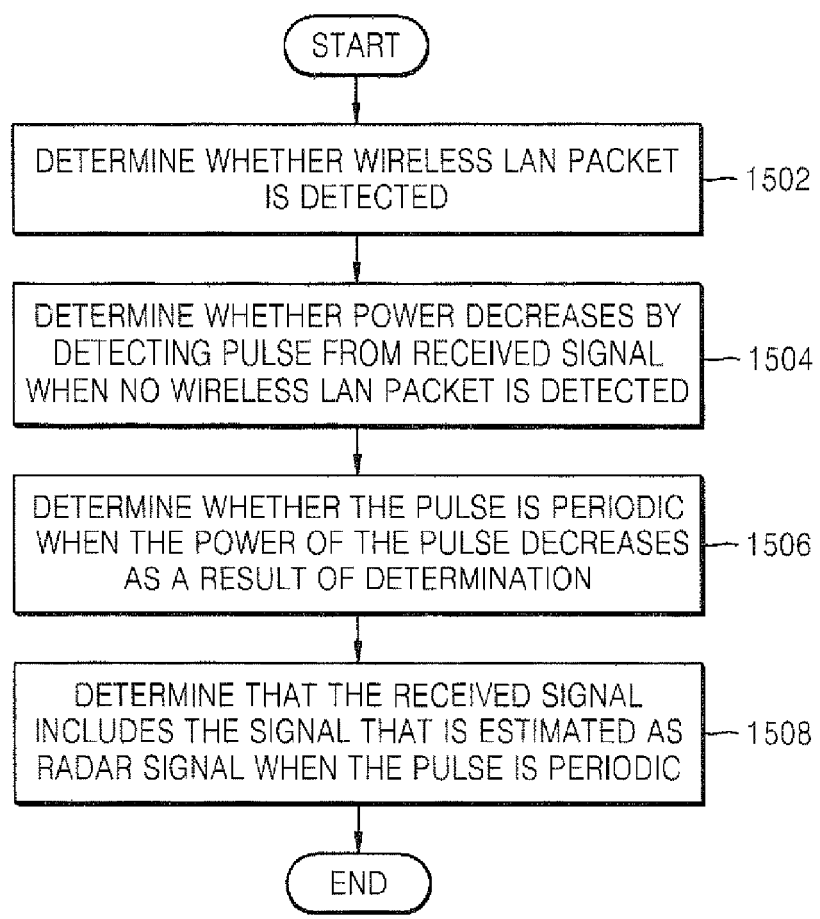
FIG. 15 is a flowchart illustrating an operation of an estimated radar signal detector of a station according to an exemplary embodiment of the present invention.

FIG. 15 is a flowchart illustrating an operation of an estimated radar signal detector of a station according to an exemplary embodiment of the present invention.

In operation 1502, it is determined whether a wireless LAN packet is detected in a received signal.

In operation 1504, when no wireless LAN packet is detected in the received signal, it is determined whether power decreases by detecting a pulse in the received signal.

In operation 1506, as a result of the determination in operation 1504, when the power of the pulse decreases, it is determined whether the pulse is periodic.

In operation 1508, when the pulse is periodic, it is determined that the received signal includes the signal that is estimated to be the radar signal.

Figure 16:
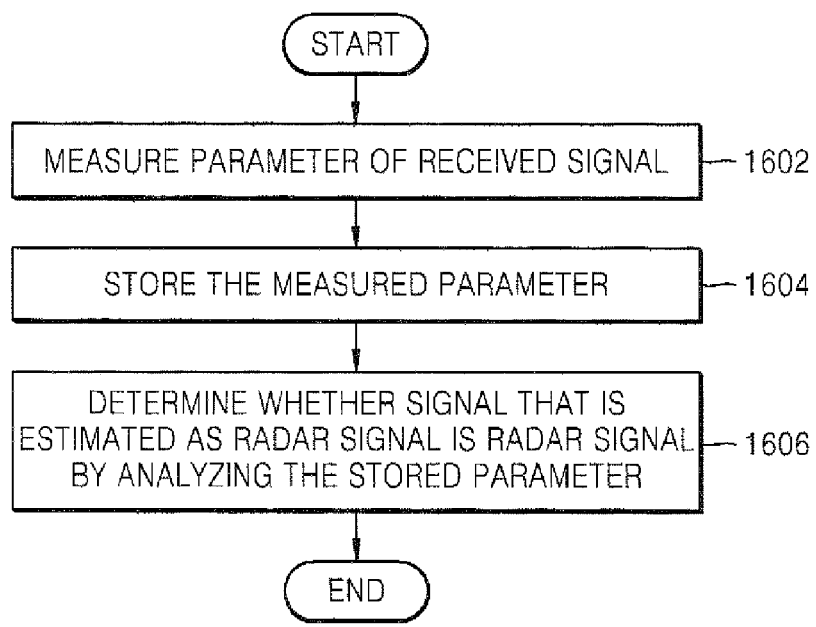
FIG. 16 is a flowchart illustrating an operation of a radar signal determiner of a station according to an exemplary embodiment of the present invention.

FIG. 16 is a flowchart illustrating an operation of a radar signal determiner of a station according to an exemplary embodiment of the present invention.

In operation 1602, a parameter of a received signal is measured.

Here, the parameter may include a generation time of the signal, pulse width, and an interval between the current signal and the previous signal.

In operation 1604, the measured parameter is stored.

As described above, operations of measuring and storing the parameter may be repeatedly performed until the capacity of the buffer 514*c*-2 is full.

In operation 1606, it is determined whether the signal that is estimated to be the radar signal is the radar signal by analyzing the stored parameters.

As described above, in order to determine whether the signal that is estimated to be the radar signal is the radar signal, when the period of the signal that is estimated to be the radar signal is similar to that of the radar signal by analyzing the parameters, it is determined that the signal that is estimated to be the radar signal is the radar signal. However, a method of determining whether the signal that is estimated to be the radar signal is the radar signal is not limited to the aforementioned method.

The frame generator 520 generates a predetermined frame used for selectively changing a direct link channel to another channel based on the determination result of the channel analyzer 510. Specifically, when it is determined that the channel needs to be changed as a result of determination of the channel analyzer 510, the frame generator 520 generates a channel change request frame in order to change channels.

Hereinafter, frames generated by the frame generator 520 according to an exemplary embodiment of the present invention will be described.

Figure 17:
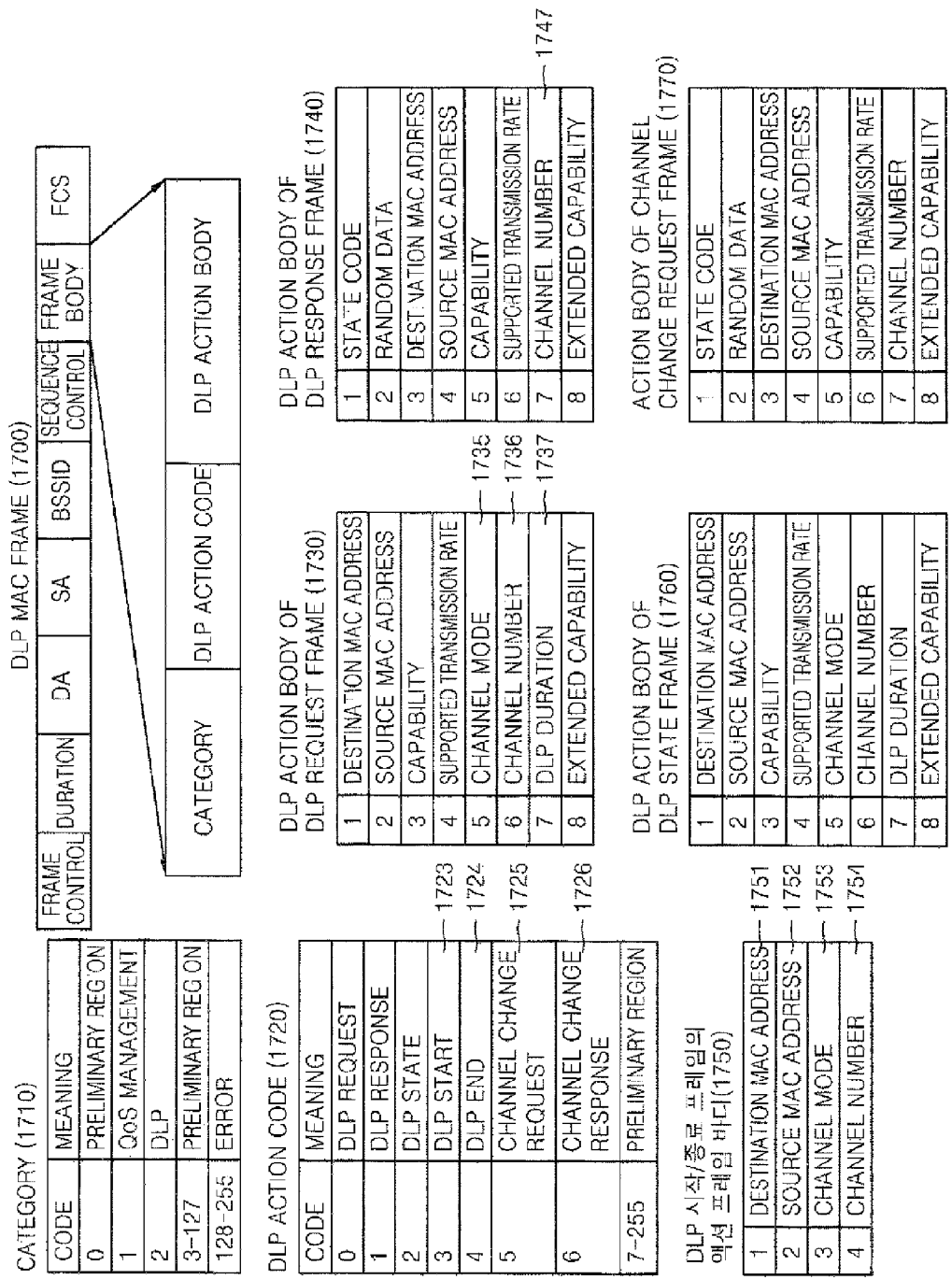
FIG. 17 illustrates a DLP MAC frame according to an exemplary embodiment of the present invention.

FIG. 17 illustrates a DLP MAC frame according to an exemplary embodiment of the present invention.

Referring to FIG. 17, the DLP MAC frame according to an exemplary embodiment of the present invention has the same external structure as the related art DLP MAC frame.

A MAC header includes frame control, duration, destination address (DA), source address (SA), basic service set ID (BSSID), and sequence control fields.

A frame body has a variable length and includes information on a category and a variable. A code that represents types of frames to be described in the following is recorded in the category. Field values which are included in the frames are stored in the variable.

A frame check sequence (FCS) field includes IEEE 32-bit cyclic redundancy code (CRC) information. However, the exemplary embodiment is different from the related art DLP MAC frame in types of category included in the frame body and fields of each DLP frame.

First, in a DLP action code 1720, codes on DLP start 1723, DLP end 1724, channel change request 1725, and channel change response 1726 are additionally defined.

A DLP start frame 1750 and a DLP end frame 1750 have the same formats. The DLP start frame and a DLP end frame 1750 may include a MAC address filed 1751 of a destination station (a station which receives a receiving station frame), a MAC address field 1752 of a source station (a station which transmits a transmitting station frame), a channel mode 1753 for recording a selected DLP mode, and a channel number field 1754 of the channel through which DLP communication is performed.

The DLP request frame 1730 is a frame for requesting a direct link before the transmitting station communicates data with the receiving station. When the transmitting station transmits data to an AP, the DLP request frame 1730 is a frame which the AP forwards to the receiving station. The fields added to the related art DLP request frame may include a channel mode field 1735 for recording a selected DLP mode, a channel number field 1736 for determining a channel that is to communicate through a direct link, and a DLP duration field 1737 for determining how long the connection through the direct link maintains.

When the transmitting station initially transmits the DLP request frame 1730 to the AP, the transmitting station cannot recognize the available channel number, and therefore, NULL is allocated to the DLP request frame 1730. The AP founds the available channel number and records the channel number in the channel number field 1736 before forwarding the channel number frame to the receiving station.

After the receiving station receives the DLP request frame 1730 and determines whether the receiving station joins the DLP direct link, the receiving station transmits the DLP request frame 1730 to the AP, and the AP forwards the DLP response frame 1740 to the transmitting station. The result of determining whether the receiving station joins the DLP direct link is represented in a state code field. A field added to the related art DLP response frame includes a channel number field 1747 having a channel number allocated to the channel number field 1736 of the DLP request frame by the AP. The transmitting station reads the channel number field 1747 of the DLP response frame and recognizes the channel number that is to be linked through the direct link. Accordingly, both stations can communicate data through one channel.

A format of a channel change request frame 1760 is the same as that of the DLP request frame 130. A format of the channel change response frame 1770 is the same as that of the DLP response frame 1740.

The frame transceiver 530 transmits a predetermined frame generated by the frame generator 520 to the access point or another station and receives the predetermined frame from the access point or another station.

Figure 18:
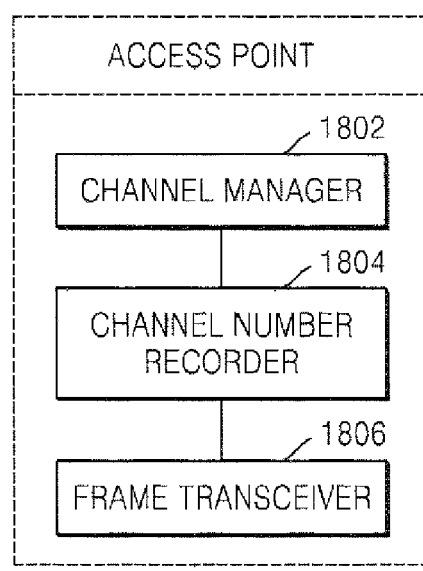
FIG. 18 illustrates an access point according to an exemplary embodiment of the present invention.

FIG. 18 illustrates an access point according to an exemplary embodiment of the present invention.

Referring to FIG. 18, the access point according to an exemplary embodiment of the present invention includes a channel manager 1802, a channel number recorder 1804, and a frame transceiver 1806.

The channel manager 1802 periodically scans the available channels for allocating channels, analyzes the scanned channels, and generates a list of the available channels.

Since the channels are limited resources, the AP cannot limitlessly allocate the channels. Table 1 illustrates an example of a list of available channels in the AP. The channel manager 1802 manages the channel list used for a BSS including a primary channel according to the channel numbers. The AP manages and allocates available channels except the primary channel in the channel list in ascending order of noise according to their RSSI values.

TABLE 1

| Channel number | Ending time | Station list | RSSI |
|---|---|---|---|
| channel 1 | Tch1 | station1, station2 | 10 |
| ... | ... | ... | ... |
| channel 2 | Tch2 | station3, station4 | 5 |

The channel number recorder 1804 records the channel number in the channel list in the channel change request frame, when receiving the channel change request frame from a predetermined station.

The frame transceiver 1806 retransmits the channel change response frame, which is a response to the channel change request frame and the channel change request frame, to another station.

Figure 19:
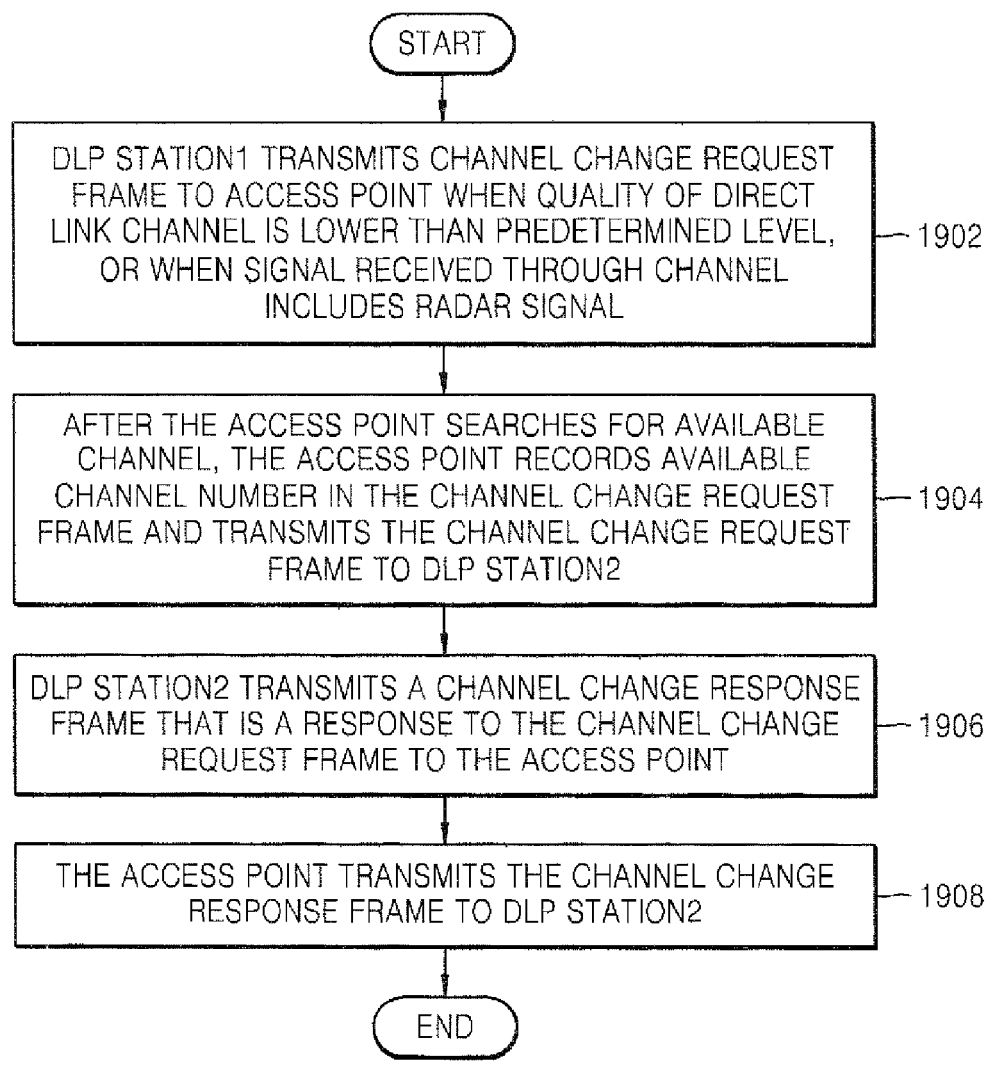
FIG. 19 is a flowchart illustrating a method of changing channels according to an exemplary embodiment of the present invention.

FIG. 19 is a flowchart illustrating a method of changing channels according to an exemplary embodiment of the present invention. When the stations which transmit and receive data using the DLP are a DLP station1 and a DLP station2, respectively, the method of changing channels is as described below.

In operation 1902, when quality of a direct link channel is lower than a predetermined level, or when a signal received through a channel includes a radar signal, the DLP station1 transmits the channel change request frame to an access point.

As described above, the channel change request frame is transmitted because the channel has to be changed when the quality of the direct link channel is lower than predetermined level or when the signal received through the channel includes a radar signal.

In operation 1904, after the access point searches for an available channel, the access point records the available channel number in the channel change request frame and transmits the channel change request frame to the DLP station2, when the available channel is found.

When the DLP station1 transmits the channel change request frame to the access point, the DLP station1 cannot recognize the available channel number, and therefore, NULL is allocated to the channel number field. The access point founds the available channel number and records the channel number in the channel number field when the access point transmits the channel change request frame to the DLP station2.

In operation 1906, the DLP station2 transmits a channel change response frame that is a response to the channel change request frame to the access point.

The channel change response frame may include an agreement of changing the channel or disagreement of changing the channel. When the channel change response frame includes the agreement of changing the channel, the channel can be changed.

In operation 1908, the access point transmits the channel change response frame to the DLP station2.

When the DLP station1 receives the channel change response frame including the agreement of changing the channel, a direct link channel between the DLP station1 and the DLP station2 is formed.

The DLP communication according to an exemplary embodiment of the present invention operates in three modes.

In a DLP mode 1, a DLP method defined in 802.11e standard specification is used. DLP mode 2 and DLP mode 3 may be used depending on the type of the transmission medium or the communication with other stations in the BSS.

In a DLP mode 2, communication with other stations in the BSS can be performed while transmission is being performed using DLP through channel contention. In a DLP mode 3, since a virtual BSS is made for DLP stations during DLP duration, the DLP mode 3 is effectively used for streaming or stable transmission. In the DLP mode 2 and the DLP mode 3, since an independent DLP channel is allocated to the DLP station, a stable throughput is obtained. Since contention is reduced for all the stations in the BSS, the use of the channels can be maximized.

In the exemplary embodiment of the present invention, a DCF and a PCF are used. However, for convenience of description, hereinafter, a case where only the DCF is used will be described.

When only the DCF is used, the DLP station competes with other stations in the BSS after forming a direct link by using the DLP. When the DLP station loses the contention, the DLP station is not on standby during a NAV period and communicates data with other DLP stations using an independent channel. When the DLP station wins the contention, the DLP station broadcasts the duration for which data is communicated between the DLP stations to other stations. During broadcasting the duration, the DLP station communicates data with another station using the independent DLP channel. During the period (DLP NAV), other stations operate according to the DCF rule. After the period (DLP NAV), the DLP stations returns to the primary channel again, and all the stations operate according to the DCF rule.

Hereinafter, a method of changing channels according to an exemplary embodiment of the present invention in the DLP mode 2 or DLP mode 3 will be described.

Figure 20:
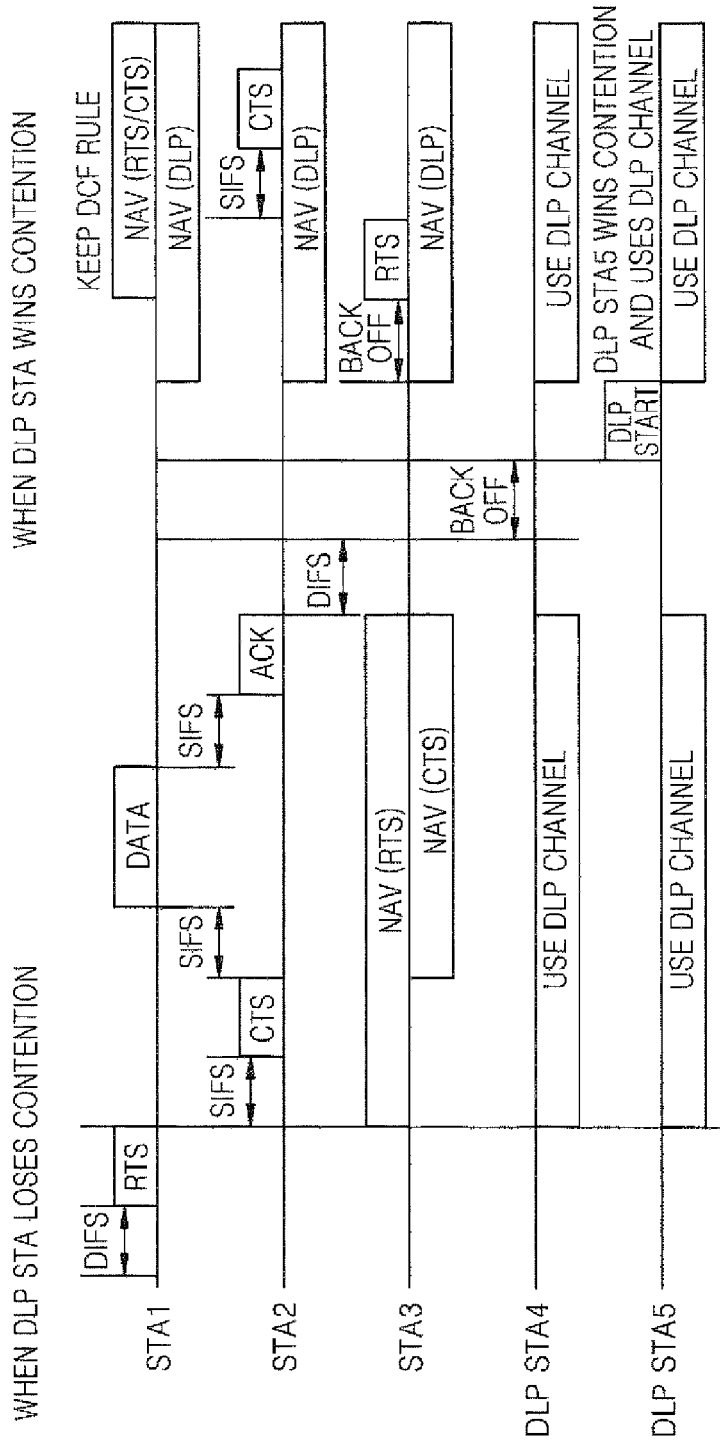
FIG. 20 illustrates a procedure of transmitting data in DLP mode 2 according to an exemplary embodiment of the present invention.

FIG. 20 illustrates a procedure of transmitting data in DLP mode 2 according to an exemplary embodiment of the present invention.

Referring to FIG. 20, the DLP station4 competes with other stations in the BSS after forming a direct link by using the DLP. When the DLP station loses the contention, the DLP station4 is not on standby during a NAV period and improves the throughput per hour in the DLP station using the DLP channel. When the DLP station4 communicates with not the DLP stations but other stations in the BSS, the DLP station4 communicates data using the primary channel according to the DCF rule. For other stations, the frequency of using the primary channel by the DLP stations is reduced, and accordingly, more opportunities of using the channels are provided for the stations in the BSS.

When the DLP station wins the contention, the DLP station does not use the primary channel and communicates data through the DLP channel. Other stations compete again and communicate according to the DCF basic contention algorithm. As shown in FIG. 20, in the method of distinguishing the case where the DLP station wins the contention from the case where the DLP station loses the contention, communication between the DLP stations and the other stations in the BSS can be performed, and the advantage of DLP and the entire channel efficiency can be improved.

Figure 21:
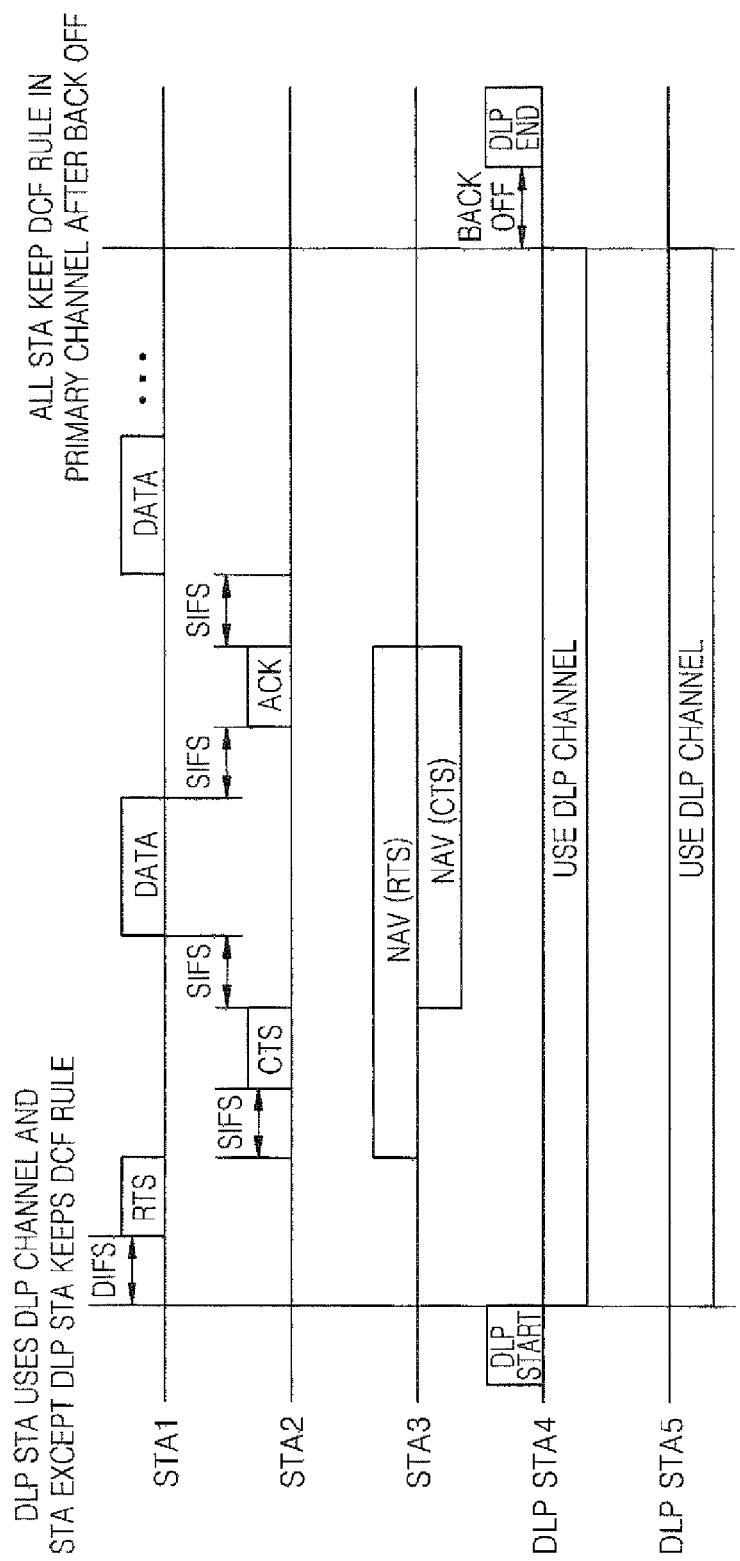
FIG. 21 illustrates a procedure of transmitting data in DLP mode 3 according to an exemplary embodiment of the present invention.

FIG. 21 illustrates a procedure of transmitting data in DLP mode 3 according to an exemplary embodiment of the present invention The DLP mode 3 may be used when streaming or maximum transmission rate is required. After the direct link is set up, the communication with the primary channel is excluded, and the DLP channel is allocated by the AP and used as an independent channel. While the DLP station (STA) communicates data using the DLP channel, the rest STAs communicates data through the primary channel according to the DCF rule.

In order to use the DLP channel, the DLP station informs the AP and stations in the BSS that the DLP station uses another channel by broadcasting the DLP mode and the DLP channel allocated by the AP to the DLP start frame. The AP manages the DLP stations as sleeping stations.

When the DLP channel ends and is changed with the primary channel, a channel is obtained after backoff when the channel is changed, the DLP station informs the DLP end frame that the direct link ends. The DLP mode 3 is very effective in a case where streaming has to be performed between designated stations by excluding communication with other stations, and specifically in a case of multimedia transmission in which QoS has to be secured.

Figure 22:
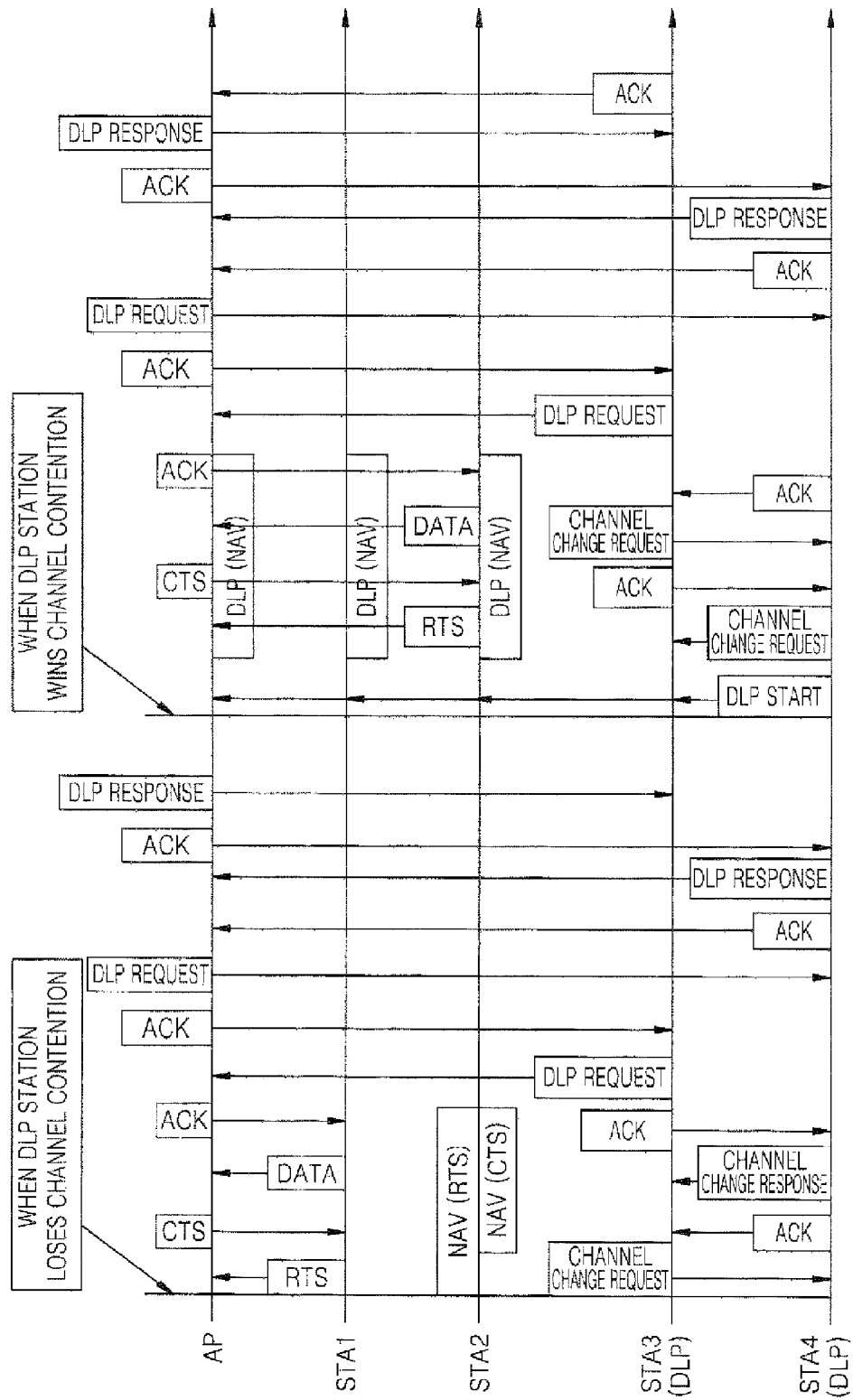
FIG. 22 illustrates a procedure of changing channels in the procedure of transmitting data in DLP mode 2.

FIG. 22 illustrates a procedure of changing channels in the procedure of transmitting data in DLP mode 2

4-way handshake is performed after STA3 sends a channel change request frame and receives a channel change response frame from STA4 through a DLP channel. When DLP channel state is so bad, STA3 sends the channel change request frame and does not receive the channel change response frame. At this time, the 4-way handshake is performed. This is because a DLP station periodically communicates with a primary channel in the DLP mode 2.

Figure 23:
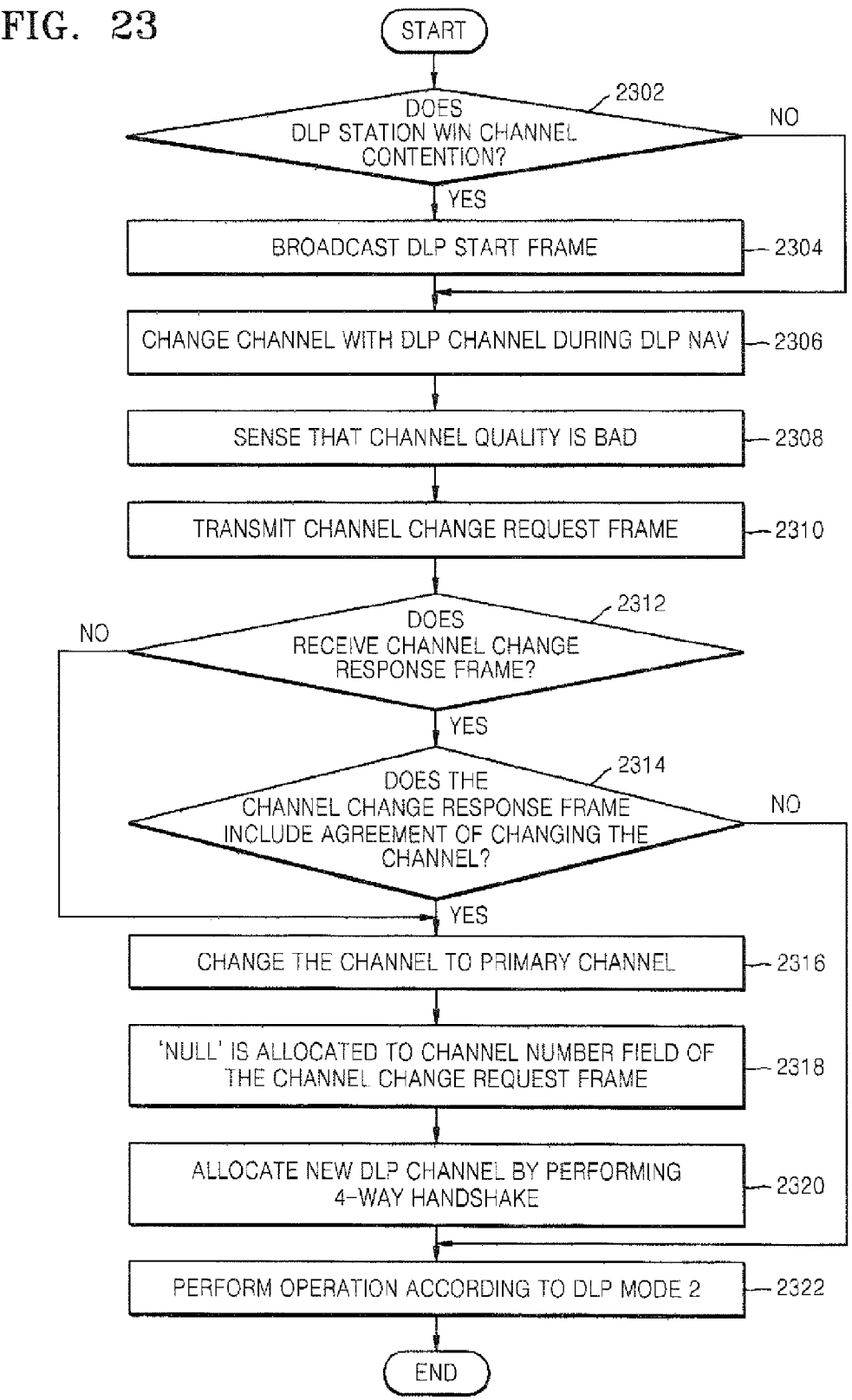
FIG. 23 is a flowchart illustrating the procedure of changing channels in the procedure of transmitting data in DLP mode 2 shown in FIG. 22.

FIG. 23 is a flowchart illustrating the procedure of changing channels in the procedure of transmitting data in DLP mode 2 shown in FIG. 22

In operation 2302, it is determined whether a DLP station wins contention during the DLP mode 2.

In operation 2304, when the DLP stations win the contention, the DLP stations broadcast a DLP start frame.

In operation 2306, when the DLP stations lose the contention, or when the DLP stations win the contention and broadcast the DLP start frame, the DLP stations are changed with an independent DLP channel during a DLP NAV period.

In operation 2308, a station3 senses that quality of the current DLP channel is bad.

In operation 2310, the station3 requests a station4 to change the current channel with a new channel and communicate data by transmitting the channel change request frame to the station4.

In operation 2312, the station4 transmits the channel change response including whether the station3 accepts the channel change request to the station3 and determines whether the station3 receives the channel change response.

In operation 2314, when the station3 receives the channel change response frame, the station3 determines whether the channel change response frame includes an agreement of changing the channel.

In operation 2316, when the channel change response frame in operation 2314 includes the agreement of changing the channel or when the station3 does not receive the channel change response frame in operation 2312, the current channel is changed with the primary channel.

As described above, when the channel change response frame is not received, the current channel is changed with the primary channel because it is determined that the current DLP channel quality is not good.

In operation 2318, a station which desires to transmit data among DLP stations allocates NULL to a channel number field of the channel change request frame.

In operation 2320, the AP allocates a new DLP channel to the station which desires to transmit data by performing the 4-way handshake.

In operation 2322, an operation according to the DLP mode 2 is performed through the allocated channel.

Figure 24:
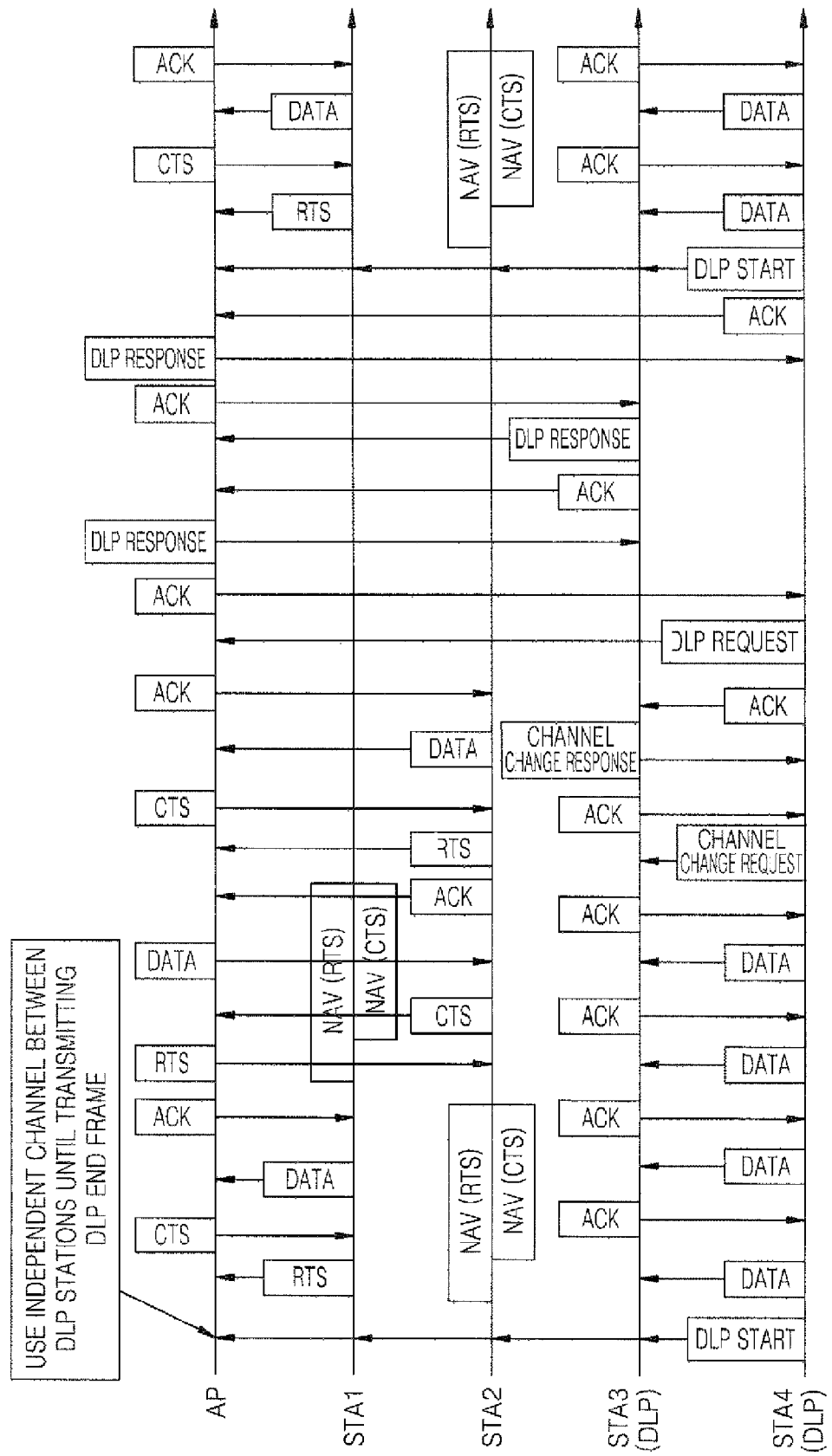
FIG. 24 illustrates a procedure of changing channels in the procedure of transmitting data in DLP mode 3.

FIG. 24 illustrates a procedure of changing channels in the procedure of transmitting data in DLP mode 3.

When data is communicated between DLP stations using an independent DLP channel until the transmitting station among the DLP stations transmits a DLP end frame, the STA4 which determines that the DLP channel quality is bad sends the channel change request frame and receives the channel change response frame from the STA3. Then, the 4-way handshake is performed.

FIG. 25 is a flowchart illustrating the procedure of changing channels in the procedure of transmitting data in DLP mode 3 shown in FIG. 24.

In operation 2502, the station4 senses that the quality of the current DLP channel is bad.

In operation 2504, the station4 requests the station3 to change the current channel with a new channel and communicate data by transmitting the channel change request frame to the station4.

In operation 2506, the station3 transmits the channel change response including whether the station4 accepts the channel change request to the station4 and determines whether the station 4 receives the channel change response.

In operation 2508, it is determined whether the channel change response frame includes an agreement of changing the channel.

In operation 2510, when the channel change response frame includes the agreement of changing the channel or when the station4 dose not receive the channel change response frame in operation 2506, the current channel is changed with the primary channel.

In operation 2512, a station which desires to transmit data among DLP stations allocates NULL to a channel number field of the channel change request frame.

In operation 2514, the AP allocates a new DLP channel to the station which desires to transmit data by performing the 4-way handshake.

In operation 2516, an operation according to the DLP mode 3 is performed through the allocated channel.

In the present invention, there is provided communication environments capable of minimizing data loss due to interference or decrease of signal strength through a method of actively changing a channel according to a DLP channel state and providing a stable and high transmission rate.

The exemplary embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A communication method in a wireless network using a direct link by a first device, the method comprising:
   determining whether a quality of a direct link channel is lower than a predetermined level, during communication using the direct link;
   requesting an access point to allocate an available channel when it is determined that the quality of the direct link channel is lower than the predetermined level; and
   changing the direct link channel from the direct link channel to a second direct link channel, allocated by the access point in response to the request for the available channel,
   wherein the wireless network includes the access point that controls the wireless network and the communication using the direct link is direct communication between the first device and a second device communicating with each other on the wireless network using the direct link without transmitting data through the access point, and
   wherein the determining whether the quality of the direct link channel is lower than the predetermined level comprises:
      determining whether a predetermined number of frames having an averaged received signal strength indication (RSSI) less than a threshold occur during a period of time; or
      determining whether a number of successive retrials per a number of frames in a period of time exceeds a predetermined retrial limit.

2. The method of claim 1, further comprising:
   determining whether a signal received through the direct link channel includes a radar signal; and
   changing the direct link channel from the direct link channel to the second direct link channel when it is determined that the received signal includes the radar signal,
   wherein the determining whether the received signal includes the radar signal comprises:
      measuring to determine whether received signal strength indication (RSSI) exceeds a threshold;

determining whether the received signal includes a signal that is estimated to be the radar signal if the RSSI exceeds the threshold from a result of the measuring to determine whether RSSI exceeds the threshold; and determining whether the signal that is estimated to be the radar signal is a radar signal if the received signal includes the signal that is estimated to be the radar signal, and wherein the determining whether the received signal includes the signal that is estimated to be the radar signal further comprises reducing a strength of a wireless local area network (LAN) signal so that a strength difference between the wireless LAN signal and the signal that is estimated to be the radar signal is equal to or less than a strength difference threshold, if the received signal includes the wireless LAN signal, and the strength difference is equal to or greater than the strength difference threshold.

3. The method of claim 2, wherein the determining whether the received signal includes the signal that is estimated to be the radar signal further comprises determining that the received signal includes the signal that is estimated to be the radar signal, if a wireless local area network (LAN) packet is detected in the received signal, and a signal error caused by inaccurately receiving signal information occurs.

4. The method of claim 2, wherein the determining whether the received signal includes the signal that is estimated to be the radar signal further comprises determining that the received signal includes the signal that is estimated to be the radar signal, if a wireless local area network (LAN) packet is detected in the received signal, and an equalized signal to noise ratio sharply decreases.

5. The method of claim 2, wherein the determining whether the received signal includes the signal that is estimated to be the radar signal further comprises determining that the received signal includes the signal that is estimated to be the radar signal, if a wireless local area network (LAN) packet is detected in the received signal, and a frame check sequence (FCS) error caused by inaccurately receiving contents of data occurs.

6. The method of claim 2, wherein the determining whether the received signal includes the signal that is estimated to be the radar signal further comprises:
determining whether power decreases by detecting a pulse in the received signal, if no wireless local area network (LAN) packet is detected in the received signal; and
determining that the received signal includes the signal that is estimated to be the radar signal, based on whether the pulse is periodic and whether it is determined that the power of the pulse decreases.

7. The method of claim 2, wherein the determining whether the received signal includes the signal that is estimated to be the radar signal further comprises:
measuring a parameter of the received signal;
storing the parameter; and
determining whether the signal that is estimated to be the radar signal is the radar signal by analyzing the stored parameter.

8. The method of claim 7, wherein the measuring the parameter and the storing the measured parameter are repeatedly performed until a number of the stored parameters exceeds a parameter number threshold.

9. The method of claim 7, wherein the parameter includes at least one of a generation time of the received signal, pulse width, and an interval between a current signal and a previous signal.

10. The method of claim 7, wherein in the determining whether the signal that is estimated to be the radar signal, the signal that is estimated to be the radar signal is determined as the radar signal if the period of the signal that is estimated to be the radar signal is similar to that of the radar signal.

11. A station in a wireless network using a direct link, the station comprising:
a channel analyzer which determines whether a quality of a direct link channel is lower than a predetermined level, during communication using a direct link;
a frame generator which generates a frame that instructs an access point to allocate an available channel when it is determined that the quality of the direct link channel is lower that the predetermined level; and
a frame transceiver which transmits the frame generated by the frame generator to the access point,
wherein the direct link channel is changed to a second direct link channel allocated by the access point and the wireless network includes the access point that controls the wireless network and the direct link channel is a communication channel using the direct link over which the station and the second device communicate with each other on the wireless network using the direct link without transmitting data through the access point, and
wherein the channel analyzer determines whether the quality of the direct link channel is lower than the predetermined level by:
determining whether a predetermined number of frames having an averaged received signal strength indication (RSSI) less than a threshold occur during a period of time; or
determining whether a number of successive retrials per a number of frames in a period of time exceeds a predetermined retrial limit.

12. The station of claim 11, wherein the channel analyzer determines whether a signal received through the direct link channel includes a radar signal, and
wherein the channel analyzer comprises:
a channel state determiner which determines whether the quality of the direct link channel is lower than the predetermined level, during communication using the direct link; and
a radar signal detector which determines whether the signal received through the channel includes the radar signal, during communication using the direct link.

13. The station of claim 12, wherein the radar signal detector comprises:
a signal strength measurer which measures a strength of the received signal and determines whether the measured strength of the received signal exceeds a threshold;
an estimated radar signal detector which determines whether the received signal includes a signal that is estimated to be the radar signal when the strength measured by the signal strength measurer is determined to exceed the threshold; and
a radar signal determiner which determines whether the signal that is estimated by the estimated radar signal detector to be the radar signal is the radar signal, when it is determined by the estimated radar signal detector that the received signal includes the signal that is estimated to be the radar signal.

14. The station of claim 13, wherein the estimated radar signal detector reduces a strength of a wireless local area network (LAN) signal so that a strength difference between the wireless LAN signal and the signal that is estimated to be the radar signal is equal to or less than a strength difference threshold, if the received signal includes the wireless LAN signal, and the strength difference is equal to or greater than the strength difference threshold.

15. The station of claim 13, wherein the estimated radar signal detector determines that the received signal includes the signal that is estimated to be the radar signal if a wireless LAN packet is detected in the received signal, and a signal error caused by inaccurately receiving signal information occurs.

16. The station of claim 13, wherein the estimated radar signal detector determines that the received signal includes the signal that is estimated to be the radar signal if a wireless LAN packet is detected in the received signal, and an equalized signal to noise ratio sharply decreases.

17. The station of claim 13, wherein the estimated radar signal detector determines that the received signal includes the signal that is estimated to be the radar signal, if a wireless LAN packet is detected in the received signal, and an frame check sequence (FCS) error caused by inaccurately receiving contents of data occurs.

18. The station of claim 13, wherein if no wireless LAN packet is detected in the received signal, the estimated radar signal detector determines whether power decreases by detecting a pulse in the signal, and if it is determined that the power of the pulse decreases, the estimated radar signal detector analyzes whether the pulse is periodic and determines that the received signal includes the signal that is estimated to be the radar signal if the pulse is periodic.

19. The station of claim 13, wherein the radar signal determiner comprises:
a parameter measurer which measures a parameter from the received signal, if the received signal includes the signal that is estimated to be the radar signal, as a result of the detection of the estimated radar signal detector;
a buffer which stores the parameter measured by the parameter measurer; and
a parameter analyzer which determines whether the signal that is estimated to be the radar signal is the radar signal by analyzing the parameters stored in the buffer.

20. The station of claim 19, wherein the parameter measurer repeatedly measures the parameter until a number of the parameters stored in the buffer exceeds a parameter number threshold, and
wherein the buffer repeatedly stores the parameter measured by the parameter measurer until a number of the stored parameters exceeds the parameter number threshold.

21. The station of claim 19, wherein the parameter includes at least one of a generation time of the received signal, pulse width, and an interval between a current signal and a previous signal.

22. The station of claim 19, wherein the parameter analyzer determines that the signal that is estimated to be the radar signal is the radar signal, if a period of the signal that is estimated to be the radar signal is similar to that of the radar signal.

23. An access point in a wireless network using a direct link, the access point comprising:
a frame transceiver which receives a channel change request frame from a first device when a quality of a direct link channel between the first device and a second device is lower than a predetermined level, transmits the channel change request frame including channel number to the second device and retransmits a channel change response frame, received from the second device, in response to the channel change request frame, to the first device;
a channel manager which scans available channels of the wireless network;
a channel number recorder which records a channel number in the received channel change request frame based on the scanned available channels; and
wherein the access point controls the wireless network and the communication using the direct link is direct communication between the first device and the second device communicating with each other on the wireless network using the direct link without transmitting data through the access point, and
wherein the quality of the direct link channel is determined to be lower than the predetermined level according to:
whether a predetermined number of frames having an averaged received signal strength indication (RSSI) less than a threshold occur during a period of time; or
whether a number of successive retrials per a number of frames in a period of time exceeds a predetermined retrial limit.

24. A communication method in a wireless network using a direct link by an access point, the method comprising:
receiving a channel change request frame from a first device when a quality of a direct link channel between the first device and a second device is lower than a predetermined level;
recording a channel number in the channel change request frame by analyzing available channels on the wireless network in response to the received channel change request frame;
transmitting a channel change request including channel number to the second device; and
retransmits a channel change response frame received from a second device, in response to the channel change request frame, to the first device,
wherein the access point controls the wireless network and the communication using the direct link is direct communication between the first device and the second device communicating with each other on the wireless network using the direct link without transmitting data through the access point, and
wherein the quality of the direct link channel is determined to be lower than the predetermined level according to:
whether a predetermined number of frames having an averaged received signal strength indication (RSSI) less than a threshold occur during a period of time; or
whether a number of successive retrials per a number of frames in a period of time exceeds a predetermined retrial limit.

25. A non-transitory computer-readable recording medium having embodied thereon a computer program for executing the method of claim 1.

26. A non-transitory computer-readable recording medium having embodied thereon a computer program for executing the method of claim 24.

* * * * *